United States Patent
Ganong, III et al.

(10) Patent No.: US 9,361,885 B2
(45) Date of Patent: Jun. 7, 2016

(54) METHODS AND APPARATUS FOR DETECTING A VOICE COMMAND

(71) Applicant: Nuance Communications, Inc., Burlington, MA (US)

(72) Inventors: William F. Ganong, III, Brookline, MA (US); Paul Adrian Van Mulbregt, Wayland, MA (US); Vladimir Sejnoha, Lexington, MA (US); Glen Edward Wilson, Maynard, MA (US)

(73) Assignee: Nuance Communications, Inc., Burlington, MA (US)

( * ) Notice: Subject to any disclaimer, the term of this patent is extended or adjusted under 35 U.S.C. 154(b) by 205 days.

(21) Appl. No.: 13/795,960

(22) Filed: Mar. 12, 2013

(65) Prior Publication Data

US 2014/0278435 A1    Sep. 18, 2014

(51) Int. Cl.
- *G10L 21/06* (2013.01)
- *G10L 15/22* (2006.01)
- *G10L 15/32* (2013.01)

(52) U.S. Cl.
CPC .............. *G10L 15/22* (2013.01); *G10L 15/32* (2013.01); *G10L 2015/223* (2013.01)

(58) Field of Classification Search
CPC .... G10L 15/22; G10L 2015/223; G10L 15/32
USPC ........................................................ 704/275
See application file for complete search history.

(56) References Cited

U.S. PATENT DOCUMENTS

| | | | |
|---|---|---|---|
| 5,428,707 A | 6/1995 | Gould et al. | |
| 5,774,859 A | 6/1998 | Houser et al. | |
| 5,802,305 A | 9/1998 | McKaughan et al. | |
| 5,983,186 A | 11/1999 | Miyazawa et al. | |
| 6,070,140 A | 5/2000 | Tran | |
| 6,092,043 A | 7/2000 | Squires et al. | |
| 6,397,186 B1 | 5/2002 | Bush et al. | |
| 6,408,396 B1 | 6/2002 | Forbes | |
| 6,411,926 B1 | 6/2002 | Chang | |
| 6,449,496 B1 | 9/2002 | Beith et al. | |
| 6,594,630 B1 | 7/2003 | Zlokarnik et al. | |
| 6,756,700 B2 | 6/2004 | Zeng | |
| 6,941,265 B2 | 9/2005 | Bi et al. | |

(Continued)

OTHER PUBLICATIONS

International Search Report and Written Opinion for PCT/US2014/024270 mailed Jun. 16, 2014.

*Primary Examiner* — Qian Yang
(74) *Attorney, Agent, or Firm* — Wolf, Greenfield & Sacks, P.C.

(57) ABSTRACT

Some aspects include a method of monitoring an acoustic environment of a mobile device operating in a low power mode, the mobile device having a first and second processor, the method comprises receiving acoustic input while the mobile device is operating in the low power mode, performing at least one first processing stage on the acoustic input using the first processor, prior to engaging the second processor, to evaluate whether the acoustic input includes a voice command, performing at least one second processing stage on the acoustic input using the second processor to evaluate whether the acoustic input includes a voice command if further processing is needed to determine whether the acoustic input includes a voice command, and initiating responding to the voice command when either the at least one first processing stage or the at least one second processing stage determines that the acoustic input includes a voice command.

17 Claims, 10 Drawing Sheets

(56) References Cited

U.S. PATENT DOCUMENTS

| | | |
|---|---|---|
| 6,965,786 B2 | 11/2005 | Qu et al. |
| 7,114,090 B2 | 9/2006 | Kardach et al. |
| 7,567,827 B2 | 7/2009 | Kim |
| 7,574,361 B2 * | 8/2009 | Yeager .................... H04B 1/401 704/260 |
| 7,720,683 B1 | 5/2010 | Vermeulen et al. |
| 7,774,204 B2 | 8/2010 | Mozer et al. |
| 8,056,070 B2 | 11/2011 | Goller et al. |
| 8,181,046 B2 | 5/2012 | Marcu et al. |
| 8,190,420 B2 | 5/2012 | Kadirkamanathan et al. |
| 8,285,545 B2 | 10/2012 | Lee et al. |
| 8,548,176 B2 | 10/2013 | Bright |
| 8,620,389 B2 | 12/2013 | Schrager |
| 8,666,751 B2 | 3/2014 | Murthi et al. |
| 8,977,255 B2 | 3/2015 | Freeman et al. |
| 2003/0040339 A1 | 2/2003 | Chang |
| 2007/0129949 A1 * | 6/2007 | Alberth et al. ............. 704/270.1 |
| 2010/0009719 A1 | 1/2010 | Oh et al. |
| 2010/0124896 A1 * | 5/2010 | Kumar ....................... 455/404.1 |
| 2010/0185448 A1 | 7/2010 | Meisel |
| 2010/0289994 A1 | 11/2010 | Nonaka |
| 2011/0054899 A1 | 3/2011 | Phillips et al. |
| 2012/0329389 A1 * | 12/2012 | Royston .............. H04B 5/0062 455/41.1 |
| 2013/0080167 A1 | 3/2013 | Mozer |
| 2013/0080171 A1 | 3/2013 | Mozer et al. |
| 2013/0289994 A1 | 10/2013 | Newman et al. |
| 2013/0339028 A1 * | 12/2013 | Rosner et al. ................. 704/275 |
| 2014/0012573 A1 | 1/2014 | Hung et al. |
| 2014/0012586 A1 | 1/2014 | Rubin et al. |
| 2014/0274203 A1 | 9/2014 | Ganong, III et al. |
| 2014/0274211 A1 | 9/2014 | Sejnoha et al. |

* cited by examiner

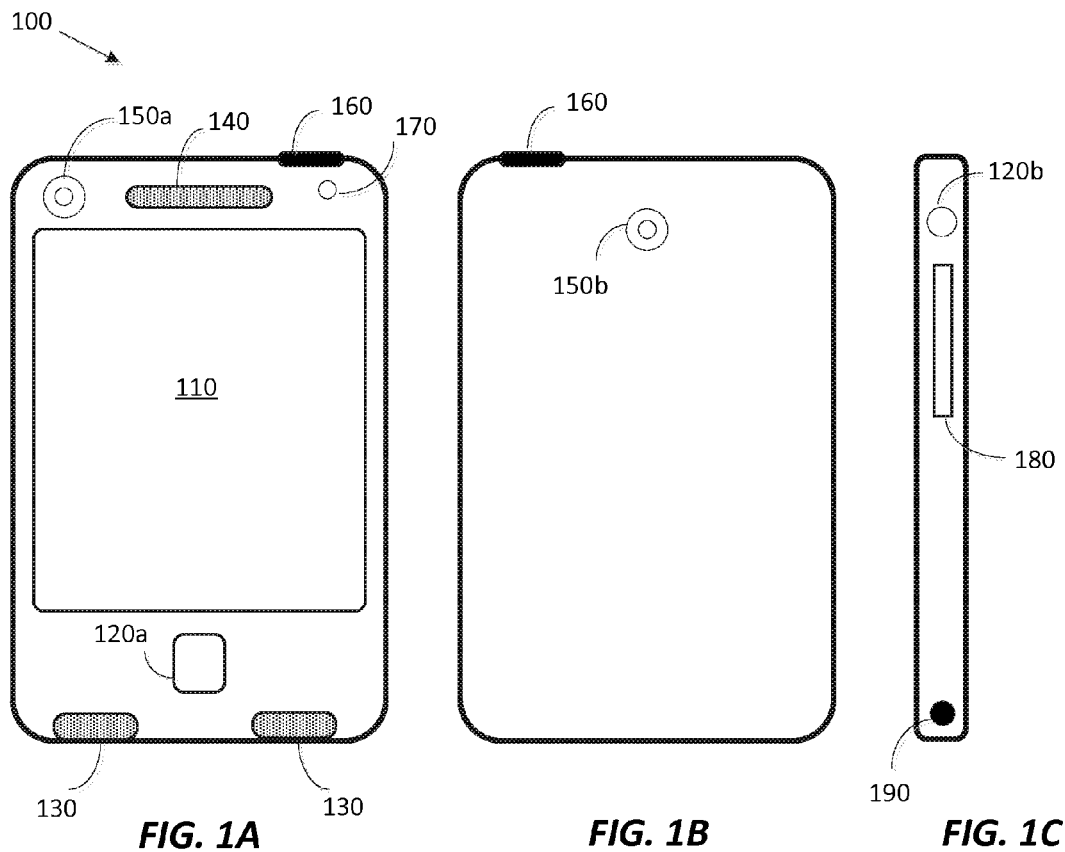
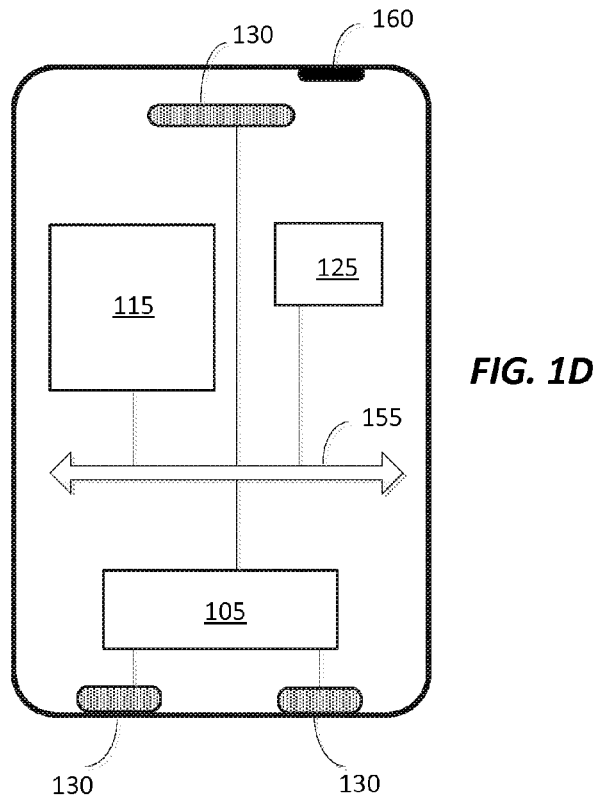
FIG. 1A  FIG. 1B  FIG. 1C
FIG. 1D

METHODS AND APPARATUS FOR DETECTING A VOICE COMMAND

BACKGROUND

Many mobile communications devices, such as smart phones, are equipped with a voice response system (e.g., a virtual assistant or agent) that can recognize speech and respond to voice commands to perform desired tasks (perform an Internet search, make a phone call, provide directions, answer questions, make recommendations, schedule appointments, etc.). However, engaging the voice response system conventionally requires one or more manual actions by the user before the system is engaged and ready to respond to speech input from the user. For example, the user may have to activate an icon (e.g., via touch) to launch a virtual assistant application, or manipulate a software or hardware interface control on the mobile device to engage the voice response system (e.g., activate a microphone display icon, press a button, activate a switch, etc.).

Such manual actions requiring the user's hands, referred to herein as "manual triggers," complicate the interaction with a mobile device and, in some instances, may be prohibitive (e.g., when a user's hands are otherwise occupied). Voice triggers have been implemented to eliminate at least some of the manual actions required to activate a voice response system in an attempt to provide generally hands-free access to the voice response system. However, conventional voice response systems are responsive to voice triggers in limited contexts such as when the mobile device is active (i.e., awake), and require an explicit trigger word or phrase to engage the mobile device's voice response capabilities. As such, a user must speak a specific and predetermined word or phrase, referred to as an explicit voice trigger, to engage the voice response system and conventionally can only do so when the mobile device is active. That is, conventional voice response systems are unresponsive when the mobile device is asleep.

When a mobile device is operating in a low power mode (e.g., in a sleep, hibernate or idle mode), the actions required to engage the voice response system typically become even more extensive. In particular, the user need first wake-up the mobile device itself before the voice response system can be engaged using manual action or an explicit voice trigger. For example, a user may have to press a button to turn-on the display and/or enable one or more processors, may have to manipulate one or more controls to ready the mobile device for use, and/or may have to input a passcode if the mobile device has been inactive for a certain period of time.

Thus, wake-up actions may further hamper the use of a voice response system in ways that may be inconvenient or annoying under normal circumstances and prohibitive in others (e.g., while operating a vehicle, or engaging in other tasks that occupy the user's hands). Conventionally, these wake-up actions are unavoidable. Moreover, to engage a voice response system from a low power mode, one or more wake-up actions must then be followed by one or more manual and/or explicit voice triggers to engage the voice response system to be ready to respond to a user's speech.

SUMMARY

Some embodiments include a method of monitoring an acoustic environment of a mobile device, the method comprising receiving, by the mobile device, acoustic input from the environment of the mobile device, detecting whether the acoustic input includes a voice command from a user without requiring receipt of an explicit trigger from the user, and initiating responding to the detected voice command.

Some embodiments include at least one computer-readable medium encoded with instructions that, when executed on at least one processor, perform a method of monitoring an acoustic environment of a mobile device to receive acoustic input from the environment of the mobile device, the method comprising detecting whether the acoustic input includes a voice command from a user without requiring receipt of an explicit trigger from the user, and initiating responding to the detected voice command.

Some embodiments include a mobile device comprising at least one input for receiving acoustic input from the environment of the mobile device, and at least one processor configured to detect whether the acoustic input includes a voice command from a user without requiring receipt of an explicit trigger from the user, and initiate responding to the detected voice command.

Some embodiments include a method of monitoring an acoustic environment of a mobile device for voice commands when the mobile device is operating in a low power mode, the method comprising receiving acoustic input from the environment of the mobile device while the mobile device is operating in the low power mode, detecting whether the acoustic input includes a voice command based on performing a plurality of processing stages on the acoustic input, wherein at least one of the plurality of processing stages is performed while the mobile device is operating in the low power mode, and using at least one contextual cue to assist in detecting whether the acoustic input includes a voice command.

Some embodiments include at least one computer readable medium encoded with instructions that, when executed on at least one processor, perform a method of monitoring an acoustic environment of a mobile device to receive acoustic input from the environment of the mobile device while the mobile device is operating in a low power mode, the method comprising detecting whether the acoustic input includes a voice command based on performing a plurality of processing stages on the acoustic input, wherein at least one of the plurality of processing stages is performed while the mobile device is operating in the low power mode, and using at least one contextual cue to assist in detecting whether the acoustic input includes a voice command.

Some embodiments include a mobile device comprising at least one input to receive acoustic input from an environment of the mobile device while the mobile device is operating in a low power mode, at least one processor configured to detect whether the acoustic input includes a voice command based on performing a plurality of processing stages on the acoustic input, wherein at least one of the plurality of processing stages is performed while the mobile device is operating in the low power mode, and use at least one contextual cue to assist in detecting whether the acoustic input includes a voice command Some embodiments include a method of monitoring an acoustic environment of a mobile device for voice commands when the mobile device is operating in a low power mode, the mobile device having a first processor and second processor, the method comprising receiving acoustic input while the mobile device is operating in the low power mode, performing at least one first processing stage on the acoustic input using the first processor, prior to engaging the second processor to process the acoustic input, to evaluate whether the acoustic input includes a voice command, performing at least one second processing stage on the acoustic input using the second processor to evaluate whether the acoustic input includes a voice command if further processing is needed to determine whether the acoustic input includes a voice command, and initiating responding to the voice command when either the at least one first processing stage or the at least one second processing stage determines that the acoustic input includes a voice command.

Some embodiments include at least one computer readable medium storing with instructions that, when executed on at least one processor, perform a method of monitoring an acoustic environment of a mobile device to receive acoustic input from the environment of the mobile device while the mobile device is operating in a low power mode, the mobile device having a first processor and second processor, the method comprising performing at least one first processing stage on the acoustic input using the first processor, prior to engaging the second processor to process the acoustic input, to evaluate whether the acoustic input includes a voice command, performing at least one second processing stage on the acoustic input using the second processor to evaluate whether the acoustic input includes a voice command if further processing is needed to determine whether the acoustic input includes a voice command, and initiating responding to the voice command when either the at least one first processing stage or the at least one second processing stage determines that the acoustic input includes a voice command.

Some embodiments include a mobile device comprising at least one input to receive acoustic input from an environment of the mobile device while the mobile device is operating in the low power mode, a first processor to perform at least one first processing stage on the acoustic input to evaluate whether the acoustic input includes a voice command, a second processor to perform at least one second processing stage on the acoustic input to evaluate whether the acoustic input includes a voice command, wherein the at least one first processing stage is performed prior to engaging the second processor, wherein the at least one second processing stage is performed if further processing is needed to determine whether the acoustic input includes a voice command, and wherein response to the voice command is initiated when either the at least one first processing stage or the at least one second processing stage determines that the acoustic input includes a voice command.

BRIEF DESCRIPTION OF DRAWINGS

Various aspects and embodiments of the application will be described with reference to the following figures.

FIGS. 1A, 1B and 1C illustrate an exemplary mobile device on which voice response techniques may be implemented;

FIG. 1D illustrates exemplary system components of an illustrative mobile device on which voice response techniques may be implemented;

DETAILED DESCRIPTION

Figure 2:
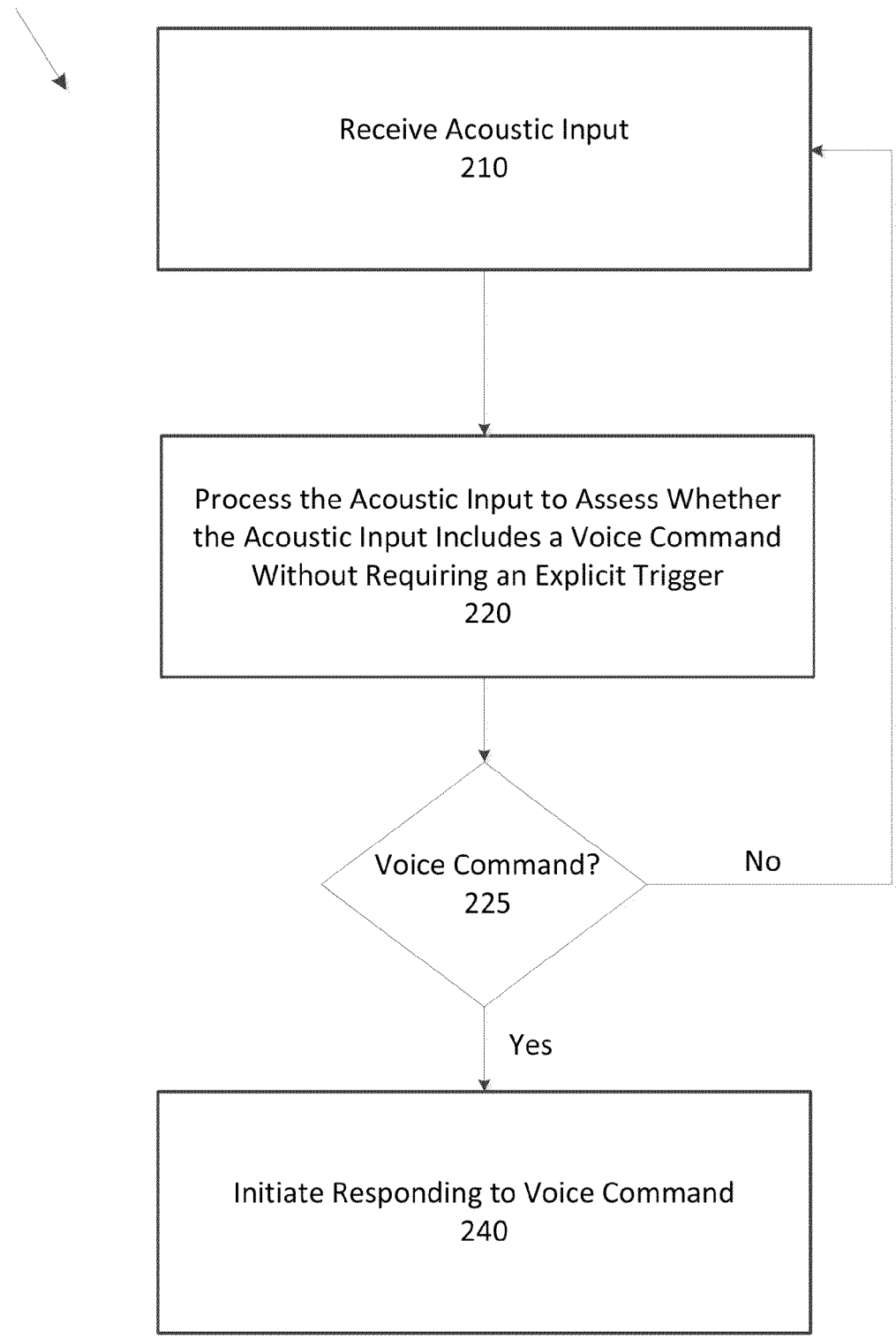
FIG. 2 is a flow chart illustrating a method of determining whether acoustic input received from the environment of a mobile device includes a voice command, without using an explicit trigger, in accordance with some embodiments.

As discussed above, conventional voice response systems require one or more explicit triggers to engage the voice response system. An "explicit trigger" refers herein to one or more specific, designated and predetermined actions required to engage a voice response system, and includes manual triggers (i.e., actions performed on the mobile device via a user's hands) and explicit voice triggers (i.e., speaking a specific, designated word or phrase to engage the voice response system).

The inventors have appreciated that user interaction with a mobile device may be improved if the user could interact with a voice response system of the mobile device simply by speaking one or more desired voice commands, without having to issue one or more explicit triggers. The term "voice command" refers herein to any type of actionable voice input from a user to a voice response system, including, but not limited to, voice requests (e.g., "Schedule my doctor's appointment for tomorrow at 9 am," "Call Tom," "Remind me to pick-up kids tonight," "Please recommend a nearby Chinese restaurant," "Search for attractions in Boston," "Take dictation," etc.), voice queries (e.g., "Where is the nearest gas station?" "What is the temperature in Boston?" "How do I get to the Mass Pike from here?" "What appointments do I have scheduled today?" "How many tablespoons are in a cup?" etc.), and explicit voice triggers (e.g., "Hello, Dragon") to engage a voice response system.

Mobile devices are generally power-limited in that they are frequently expected to operate for relatively extended periods of time off of battery power. To conserve power, mobile devices frequently enter a low power mode (e.g., a sleep or hibernate mode) after some duration of inactivity. A low power mode refers generally to any mode or state that is entered to conserve power that conventionally requires one or more manual wake-up actions to exit (e.g., to activate the mobile device). Mobile devices may have more than one low power mode and different mobile devices may power down different components when entering a low power mode. However, mobile devices will typically have some variation of a low power mode that conventionally requires manual action to exit the low power mode and transition to an active mode.

Entering a low power mode may include turning off the display, shutting down one or more processors (e.g., disabling the clock tree associated with one or more processors) and/or deactivating components that would otherwise draw power if left operational. Automatically entering a low power mode after a designated interval of time may significantly extend the period that a mobile device can operate on battery power before requiring a recharge. In view of the relative importance of conserving power in a mobile device, many mobile devices default to a relatively short duration of inactivity before powering down and going to sleep, such that a mobile device may frequently be in a low power mode when a user wants to access functionality on the mobile device.

As discussed above, one or more manual actions must be performed to wake-up the mobile device before the device can be utilized. Conventional wake-up triggers are manual in that they require the user's hands to activate the mobile device. Though many mobile devices are designed to at least partially wake-up when certain events occur (e.g., when an incoming telephone call is received, when an alert or alarm is set and executes), the user generally must perform the appropriate manual triggers to achieve a user initiated wake-up of the mobile device if the user would like to engage with a voice response system. Such manual triggers may be inconvenient, annoying and/or, in some circumstances, prohibitive (e.g., when the user is driving or the user's hands are otherwise occupied).

The inventors have recognized that user experience improvements may result if a user could engage with a mobile device via voice activation even when the mobile device is operating in a low power mode. Moreover, the inventors have appreciated that voice activation functionality may facilitate hands-free interaction with a mobile device in virtually any situation, independent of whether the mobile device is operating in an active or in a low power mode (e.g., a sleep mode). That is, from the perspective of the responsiveness of the mobile device, the inventors have appreciated the utility of providing voice activation functionality that makes it appear that the mobile device is "always-on" by monitoring the acoustic environment (e.g., the voice response system of the mobile device can be voice initiated or activated whether the device is in an active mode or in a low power mode).

The term "always-on" is used herein to describe the ability of a voice response system of a mobile device to be generally responsive to voice (e.g., capable of detecting when a voice command has been spoken) both when a mobile device is active and when the device has entered a low power mode. To achieve such "always-on" functionality, the acoustic environment of the mobile device may need to be monitored both in active and low power modes to obtain acoustic input and determine whether the acoustic input includes a voice command or whether the acoustic input resulted from spurious acoustic activity. The term "spurious acoustic activity" refers generally to any acoustic activity (including speech) detected in the acoustic environment of the mobile device that does not correspond to a voice command upon which the voice response system can or should act.

According to some embodiments, the acoustic environment of a mobile device is monitored to receive acoustic input when the mobile device is in a low power mode and to detect when the acoustic input includes a voice command. Rendering a mobile device responsive to voice when the mobile device is powered down in a low power mode (e.g., when the mobile device is asleep or otherwise in an inactive state that conventionally requires one or more wake-up actions) presents challenges, particularly in view of the relatively strict power consumption constraints of mobile devices. Mobile devices typically inhabit the same noisy environments of their users. Recruiting the mobile device's relatively power intensive resources each time acoustic input is received by the mobile device (e.g., when a microphone detects acoustic activity) to assess whether a voice command has been spoken could utilize significant enough processing power to frustrate the efforts of powering the mobile device down into a low power mode in the first place.

The inventors have recognized the importance of minimizing power consumption to the extent reasonable when performing processing on received acoustic input to determine whether the acoustic input includes a voice command. To this end, some embodiments utilize a hierarchical approach to monitoring and processing acoustic input that applies relatively low power processing to received acoustic information first and generally higher power processing as needed to evaluate the likelihood that the acoustic information includes a voice command. According to some embodiments, a plurality of processing stages are performed that evaluate whether acoustic input includes a voice command, wherein at least one subsequent stage of the plurality of processing stages is performed only if one or more previous processing stages is unable conclude that the acoustic input corresponds to spurious acoustic activity.

Achieving viable "always-on" operation may involve attempting to generally optimize false positive and false negative rates while keeping power consumption to a minimum to a reasonable extent. According to some embodiments, the one or more processing stages used to determine if acoustic input includes a voice command are selected in an attempt to avoid over inclusion that can result in noticeable reduction in battery life and/or the nuisance of a mobile device that too frequently wakes-up in response to spurious acoustic activity, either result of which may be unsatisfactory to the user. On the other hand, over exclusion may result in a voice response system that too frequently misses voice commands such that the mobile device is perceived by the user as non-responsive. Some embodiments include techniques designed to strike an acceptable balance in this regard.

The inventors have recognized that considering one or more contextual cues may facilitate improved assessment of whether acoustic information includes a voice command. The term "contextual cue" refers generally to information other than the properties or characteristics of the specific acoustic input being evaluated as containing a voice command. For example, a user may pick-up their mobile device or bring it closer to their mouth when preparing to speak a voice command. Thus, motion may be used as a contextual cue to influence the evaluation of whether acoustic input likely includes a voice command. Other contextual cues that may be considered, alone or in any combination, include (but are not limited to) location of the mobile device, time of day, a power state of the mobile device, occurrence of an event on the mobile device, recent activity on the mobile device, acoustic environment, etc. Contextual cues may be used to bias one or more processing stages, aid in the selection and/or omission of one or more processing stages, operate as a processing stage itself, or otherwise assist in determining whether acoustic input includes a voice command, as discussed in further detail below.

As discussed above, conserving power may be an important component of implementing "always-on" functionality. The inventors have appreciated that relatively low power processors on a mobile device, such as a secondary, specialized and/or low power processor may be utilized to perform one or more initial processing stages to determine whether received acoustic input corresponds to spurious acoustic activity, or whether higher level (and typically higher power) processing is needed to conclude that the acoustic information includes a voice command. If the one or more initial processing stages cannot dispense with the acoustic input as spurious acoustic activity, the mobile device's primary processor (e.g., main central processing unit (CPU)) may be engaged to perform one or more subsequent processing stages. Thus, a relatively substantial amount of the acoustic input received by the mobile device may be evaluated and identified as spurious acoustic activity (and thereafter ignored) without needing to activate the primary processor, as discussed in further detail below.

Numerous exemplary techniques for processing "acoustic input" obtained from monitoring the acoustic environment of a mobile phone are described herein. Different techniques may process acoustic input at different stages before and after the acoustic input has been transformed, reduced, supplemented or otherwise modified. For example, some processing stages may apply techniques to acoustic input in analog form, while other stages may process acoustic input in digital form. Some processing stages may operate on acoustic input as an audio signal, while other stages may operate on acoustic input that has been recognized, at least partially, as its constituent words.

Thus, "acoustic input" refers generally to information received from the acoustic environment or information derived therefrom. When multiple processing stages are described as processing a given acoustic input, it should be understood that the acoustic input operated on by each may be in different form and contain different information (or may be in the same form and contain essentially the same information) as the given acoustic input may have undergone different amounts and types of modifications and processing when a respective processing stage operates on it. Thus, the acoustic input refers generically to any of the forms in which it may take, unless expressly specified otherwise.

Following below are more detailed descriptions of various concepts related to, and embodiments of, methods and apparatus for implementing techniques for engaging a voice response system. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIGS. 1A-1C illustrate an exemplary mobile device on which one or more voice activation techniques may be implemented. Mobile device 100 is illustrated as having a number of components characteristic of a "smart phone," but it should be appreciated that mobile device 100 may be any generally portable device capable of wireless communications and which includes an input capable of receiving acoustic input (e.g., one or more microphones). Mobile device 100 includes one or more transducers 130 for converting acoustic energy to electrical energy and vice versa. For example, transducers 130 may include one or more speakers and/or one or more microphones arranged on the mobile device to allow input/output (I/O) of acoustic information. Different mobile devices may include differing numbers and arrangements of transducers, any of which may be suitable to facilitate acoustic I/O.

Mobile device 100 may also include one or more wireless communication components 160. For example, mobile communication devices such as cellular telephones will typically have a wireless transceiver capable of communicating with one or more cellular networks. Alternatively, or in addition to, wireless communication component 160 may include a wireless transceiver capable of communicating with one or more other networks or external devices. For example, wireless communication component 160 may include a component configured to communication via the IEEE 802.11 standard (Wi-Fi) to connect to a local area network (LAN), wide area network (WAN) such as the Internet, and/or may include a Bluetooth® transceiver to connect to a Bluetooth® compatible device. Wireless communication component 160 may also include a Global Positioning System (GPS) to communicate with a satellite network to determine the location of the mobile device, or may include one or more other wireless communication transceivers.

To simplify the illustration of exemplary mobile device 100, wireless communication component 160 is used to represent any wireless communication component 160 implemented on mobile device 100 and may include one or multiple components that may be either separate or integrated components, may be independent system components, or may be different system components in communication with one or more other wireless components. That is, wireless communication component 160 denotes one or any combination of components that may be implemented on a mobile device that allows the mobile device 100 to communicate wirelessly with one or more networks, systems and/or other devices.

Mobile device 100 may also include a display 110 for visually presenting information to the user. Display 110 may also be configured as an input device, for example, by responding to touch, pen input, etc. Mobile device 100 may include one or more other input components 120 that allow a user to interface with the mobile device. For example, button 120a may be used to initiate wake-up of the mobile device when the mobile device has entered a low power mode such as a sleep mode and/or may be used as a selection button or may include any other functionality when the mobile device is active. Button 120b may be a power button, volume button, or any other input component having any desired functionality. Different mobile devices may have different numbers and arrangements of input components 120 depending on the design of the mobile device.

Mobile device 100 may also include other components such as one or more cameras 150, one or more light emitting diodes (LEDs) 170, one or more motion detectors (discussed in further detail below), and/or any other components. Mobile device 100 may also include a power port 190 for connecting the mobile device to a power source (e.g., wall power) and/or a data port for providing/receiving data to/from another device connected via a data cable. According to some mobile device designs, the data and power port are the same port and can be used both for power and for data.

It should be appreciated that mobile device 100 is merely an example of a mobile device suitable for use with any one or combination of voice activation techniques described herein. The mobile device components are described to illustrate common features of smart phones, but no particular one or combination of these components are required. Techniques described herein are not limited for use with any particular mobile device having any particular number or arrangement of components and any mobile device having the ability to receive acoustic input may be suitable, as the aspects described herein are not limited in this respect.

FIG. 2 is a flow chart illustrating a method of monitoring an acoustic environment of a mobile device to detect voice commands, in accordance with some embodiments. As discussed above, the inventors have appreciated the benefits of a mobile device having a voice response system that evaluates received acoustic input to ascertain whether a user has spoken a voice command, without requiring an explicit trigger. In act 210, acoustic input from the environment of the mobile device is received by the mobile device. For example, one or more microphones may sense acoustic activity in the environment and obtain the resulting acoustic input for further processing to assess whether the acoustic input includes a voice command.

When the voice response system is enabled to monitor the acoustic environment, act 210 may be performed continuously or periodically at a frequency that provides an appearance of continuous monitoring, even though it may not be strictly continuous. The acoustic environment may be monitored to obtain an acoustic input over a desired interval of time before processing the acoustic input, the acoustic environment may be sampled periodically to obtain the acoustic input, an event may trigger collecting and processing of acoustic input (e.g., the microphone may indicate that sound of a given threshold has been detected), or any other method of monitoring the acoustic environment may be used such that acoustic input is received for further processing.

The acoustic environment may continue to be monitored while received acoustic input is being evaluated (e.g., act 210 may be essentially performed on a continuous, near continuous or ongoing basis while other processing is performed). New acoustic input received while prior acoustic input is being evaluated may be buffered or processed in parallel with the prior acoustic input. According to some embodiments, the new acoustic input is processed to assist in the evaluation of whether the prior acoustic input includes a voice command. In this manner, new acoustic may be used to inform the evaluation of prior received acoustic input. Also, information ascertained about the prior received acoustic input may be used to inform the evaluation of the new acoustic input received subsequently. That is, received acoustic input may be used in a feed-forward or feed-back configuration to inform the processing of acoustic input received before or after, as discussed in further detail below. Some embodiments include both feeding forward and feeding back information about acoustic input that has been received by the mobile device to better evaluate whether a voice command has been received from the user. As such, act 210 may, in some embodiments, reflect a generally ongoing process when the voice response system is enabled to monitor the acoustic environment.

According to some embodiments, a voice response system may be enabled to monitor the acoustic environment both in active and low power modes, while in some embodiments, monitoring the acoustic environment is limited to either active or lower power modes. According to some embodiments, whether the voice response system monitors the acoustic environment in active modes, low power modes or both is user selectable. In this manner, a user can choose when the mobile device should operate in an "always-on" mode and can select what operating modes the mobile device should perform "always-on" functionality.

In act 220, the acoustic input is processed to determine whether the acoustic input includes a voice command, without requiring an explicit trigger to do so. That is, the user is not required to manually engage the voice response system (e.g., by performing one or more manual triggers such as manipulating one or more interface controls by hand), nor is the user required to speak an explicit voice trigger to notify the voice response system that the user is uttering or will immanently utter an actionable voice command (though in some embodiments, the user can optionally use an explicit voice trigger if the user so desires, while not requiring the user to do so). Thus, according to some embodiments, the user is free to simply begin speaking to the mobile device to engage the voice response system.

Implementing "always-on" functionality presents challenges with respect to balancing false positive and false negative rates. If the former is too high (e.g., the voice response system is too inclusive), the mobile device will too frequently respond to spurious acoustic activity, and if the latter is too high (e.g., the voice response system is too exclusive), the mobile device will be perceived as unresponsive. According to some embodiments, a multistage processing approach may be used to facilitate balancing the false positive and false negative rates while minimizing (to the extent reasonable) the amount of power consumed in determining whether the acoustic input corresponds to spurious acoustic activity or includes a voice command.

According to some embodiments, act 220 may include performing one or more voice activity detection (VAD) processing stages that evaluate whether the acoustic input has the characteristics of voice/speech or whether the acoustic input is more likely the result of non-voice acoustic activity in the environment. VAD techniques refer generally to those that analyze one or more properties or characteristics of acoustic input (e.g., signal characteristics of acoustic input) to evaluate whether the one or more properties/characteristics are suggestive of speech, some techniques of which are described in further detail below. The result of performing one or more VAD processing stages may include assessing a likelihood that the acoustic input includes voice content, which assessment may be used to determine whether the acoustic input can be ignored as spurious acoustic activity, or whether the acoustic input should be further processed to determine the content of the acoustic input (e.g., determine the content and/or understand the content of speech).

With respect to evaluating the content of acoustic input containing speech, act 220 may include one or more speech processing stages configured to learn something about the content of the acoustic input. For example, in embodiments that employ one or more VAD processing stages, a speech processing stage (or multiple speech processing stages) may be performed on acoustic input for which voice content has been detected via the one or more VAD processing stages. The speech processing stage(s) may evaluate the acoustic input to determine the content of speech contained therein to assess whether the user has spoken a voice command.

Speech processing stages may include, but are not limited to, any one or combination of automatic speech recognition (ASR) processes such as limited vocabulary ASR (e.g., evaluating the acoustic input to determine whether a user spoke an explicit voice trigger, evaluating the acoustic input to determine whether the acoustic input includes certain words characteristic of a voice command, etc.), unrestricted and/or large vocabulary ASR, etc. Speech processing stages may include one or more language processes that seek to understand whether words in the acoustic input are characteristic of a voice command and/or to understand the meaning of what the user spoke. For example, speech processing stages may include one or more statistical classifiers, natural language processing (NLP), or any suitable language techniques designed to categorize or understand the content to facilitate determining whether a voice command has been spoken. Some non-limiting examples of speech processing stages that may be utilized are discussed in further detail below.

According to some embodiments that implement a multi-stage approach, when performing act 220, generally low power processing stages may be performed before engaging one or more higher power processing stages. By doing so, a significant amount of acoustic input may be dispensed with as corresponding to spurious acoustic activity while consuming relatively little power to generally minimize the impact on the battery. Subsequent processing stage(s) may be reserved for assessing acoustic input for which a conclusion could not be reached by earlier (and generally lower power) processing stages regarding whether the acoustic input includes a voice command or corresponds to spurious acoustic activity. In this manner, the sequence of stages may be selected to generally optimize false positive and false negative rates while attempting to keep power consumption to a minimum.

Other techniques may be used to assist in minimizing false positive and false negative rates while keeping power consumption relatively low, when performing act 220. For example, act 220 may utilize one or more contextual cues to influence the determination of whether the acoustic input includes a voice command, some exemplary contextual cues of which are described in further detail below. Alternatively or in addition to, one or more processing stages may be performed on a secondary processor (e.g., a lower power processor) and a primary processor (e.g., the main CPU) engaged only if needed to conclude whether the acoustic input includes a voice command, as discussed in further detail below. It should be appreciated that any one or combination of techniques described herein may be used to determine whether the acoustic input includes a voice command, as the aspects are limited to using any particular technique or combination of techniques.

If it is determined that the acoustic input includes a voice command, the voice response system may initiate one or more processes to respond to the voice command (act 230). For example, the voice response system may perform further language processing to understand what the voice command means and engage the necessary procedures/components required to undertake carrying out the directives of the voice command. Otherwise, the mobile device may discontinue further processing of the acoustic input and ignore it as spurious acoustic activity (e.g., non-speech sounds, background noise, speech not corresponding to a voice command or, according to some embodiments, speech from one or more people that are not the user of the mobile device, as discussed in further detail below). The voice response system may then continue to monitor the acoustic environment to obtain further acoustic input (e.g., the voice response system may return to or continue to perform act 210).

Initiating one or more further processes when acoustic input is determined to include a voice command may include, but is not limited to, engaging one or more language processing stages to understand the meaning of the voice command, initiating one or more tasks needed to carry out the voice command such as initiating a search, launching one or more applications or processes to, for example, initiate a search, schedule an appointment, update a calendar, create an alert, alarm or other electronic reminder, generate a text or email, make a telephone call, access a website, etc., responding to the user with a request for more information regarding the voice command or to confirm an understanding of the voice command, and/or initiating or performing any other task that the voice response system is capable of initiating, engaging and/or performing, either locally on the mobile device and/or remotely via one or more networks that the mobile device is capable of connecting to and interacting with. Initiating further processing may include evaluating or modifying the evaluation of subsequently received acoustic input, for example, when the detected voice command includes an explicit voice trigger.

As discussed above, the voice activation method described in FIG. 2 may be performed to monitor the acoustic environment to detect voice commands when a mobile device is operating in an active mode, when the mobile device is operating in a low power mode, or both. According to some embodiments, the manner in which acoustic input is processed may depend on whether the mobile device is operating in an active or low power mode. For example, if the mobile device is in an active mode, the display may be on, the primary processor enabled and/or other components active such that these resources may be more readily utilized without first having to activate them (e.g., if the primary processor and/or other components are already engaged, certain processing stages may be performed with less overhead and/or a number of contextual cues may be more readily accessible without incurring relatively large amounts of overhead to engage the components that provide the contextual cues and process this information).

As such, in an active mode, use of certain processing stages early on may be justified, wherein this might not be the case when operating in a low power mode (e.g., because of overhead, user expectations regarding a mobile device that is asleep, power consumption concerns, perception of the intrusiveness of the voice response system to the user, etc.). When the mobile device is operating in a low power mode, the processing strategy for determining whether acoustic input includes a voice command may proceed more conservatively with regard to utilizing resources and/or performing higher level processing stages, reserving further processing for when it is necessary. However, it should be appreciated that, while the operating mode may be advantageously used to tailor the processing strategy in some circumstances, the choice and/or order of processing stages need not depend on the operating mode of the mobile device and evaluating acoustic input may proceed in a similar or same manner independent of the operating mode of the mobile device, as the aspects are not limited in this respect. Various techniques for selecting which processing stages to perform and in what order to determine whether the acoustic input includes a voice command are discussed in further detail below.

Figure 3:
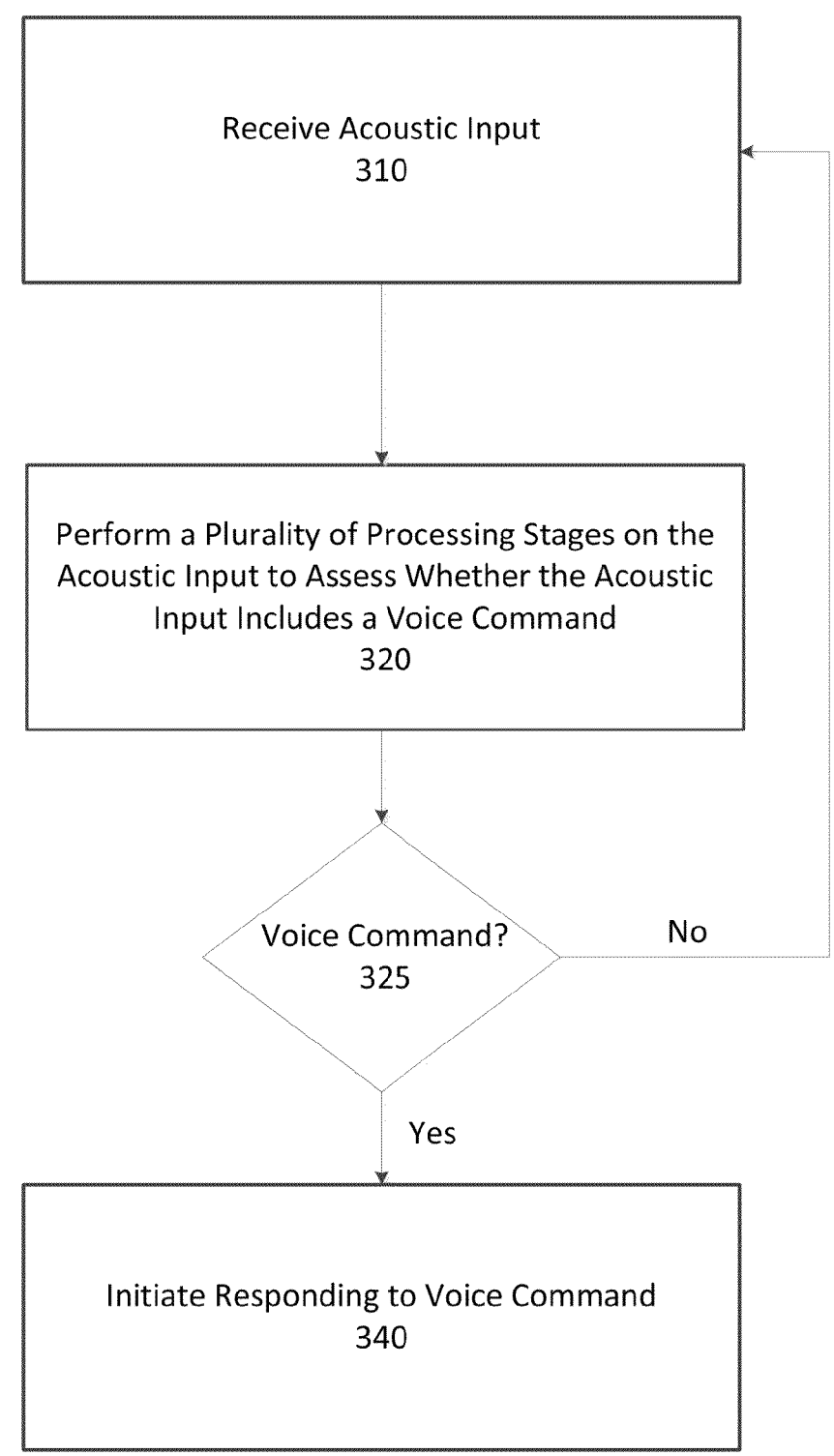
FIG. 3 is a flow chart illustrating a multi-stage processing method for determining whether acoustic input received from the environment of a mobile device includes a voice command, in accordance with some embodiments.

As discussed above, mobile devices are generally power limited and therefore conserving power may be a priority on such devices. FIG. 3 illustrates a method of using a multi-stage approach to relatively low power monitoring of the acoustic environment of a mobile device to detect uttered voice commands, in accordance with some embodiments. Method 300 may be utilized both when a mobile device is in an active mode, when the mobile device is in a low power mode (e.g., asleep, hibernating, idle, etc.), or both. Initially, acoustic input to be evaluated is received in act 310 (e.g., acoustic input is received in any of the ways described above in connection with act 210, or any other suitable manner). In act 320, a plurality of processing stages are performed on the acoustic input to evaluate whether the acoustic input likely includes a voice command, or whether the acoustic input is likely the result of spurious acoustic activity. The plurality of stages may be performed generally in a sequence (e.g., serially), may be performed in parallel, or a combination of serial and parallel processing.

A processing stage that determines that the acoustic input likely corresponds to spurious acoustic activity may terminate further processing of the acoustic input to avoid consuming additional power. A processing stage that concludes that the acoustic input likely corresponds to a voice command (e.g., to a desired level of confidence) may initiate further processing to respond to the voice command (act 330). When processing one or more stages sequentially, a processing stage that neither concludes that the acoustic input includes a voice command, nor that the acoustic input corresponds to spurious acoustic activity, may engage a subsequent processing stage to proceed with further evaluation of the acoustic input. Thus, additional processing may be reserved for circumstances in which it is needed to arrive at a conclusion about the nature of the acoustic input to conserve power.

Selecting a subsequent stage may depend on the stage itself, a confidence that a processing stage (or one or more previous stages) has in its assessment, one or more contextual cues and/or any other suitable factor. According to some embodiments, the sequence of processing stages utilized are dynamically selected with an intent to optimize false positive and false negative rates while consuming as little power as reasonable, some techniques of which are discussed in further detail below. However, in some embodiments, the sequence of stages that are utilized is essentially static and processing of the acoustic input generally proceeds in a prescribed manner until the acoustic input has been either determined to include a voice command or to correspond to spurious acoustic activity.

When performing processing stages in parallel, the results from the parallel processing stages may be used together to assess the likelihood that an acoustic input includes a voice command. For example, the results from parallel processing stages may be utilized in a voting scheme, weighted decision or other suitable manner that evaluates the information from a plurality of processing stages to assist in determining whether acoustic input includes a voice command.

According to some embodiments, both sequential/serial processing and parallel processing are used with respect to the plurality of processing stages performed to assess whether acoustic input includes a voice command. For example, a plurality of processing stages may be performed in parallel and the results may be used to determine if further processing is needed and/or which subsequent one or more processing stages should be selected for performance. Sequential and parallel processing can be used together in other ways, as the aspects are not limited in this respect.

Figure 4:
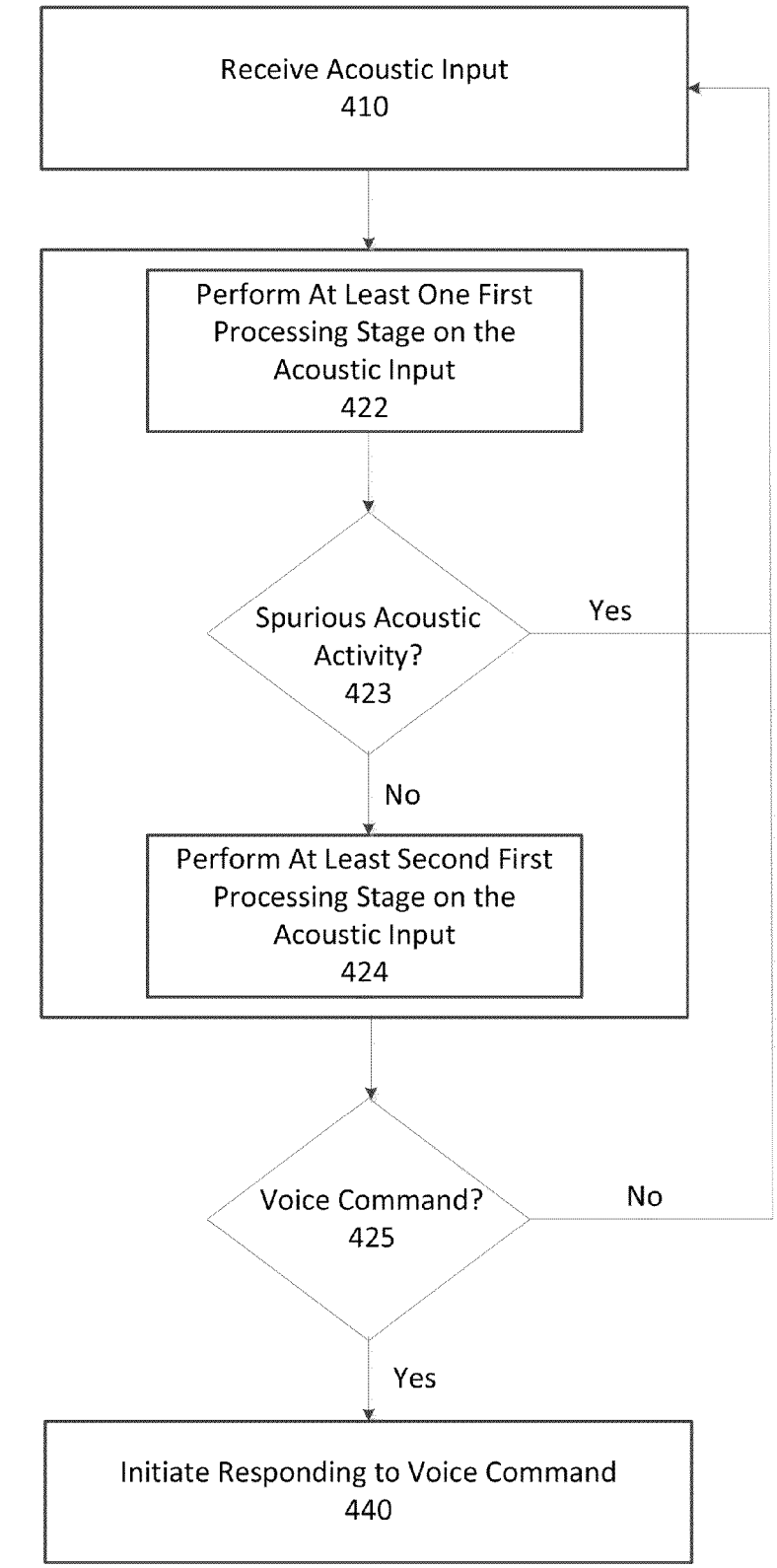
FIG. 4 is a flow chart illustrating a multi-stage processing method for determining whether acoustic input received from the environment of a mobile device includes a voice command, using at least one first processing stage followed by at least one second processing stage, in accordance with some embodiments.

FIG. 4 illustrates a multi-stage method for determining whether acoustic input includes a voice command wherein at least some of the processing stages are performed in a sequence. Method 400 may be similar in some respects to the method illustrated in FIG. 3 in that acoustic input is received and processed using a plurality of processing stage to determine whether it includes a voice command, or whether the acoustic input likely resulted from spurious acoustic activity. Method 400 provides a hierarchical approach to multi-stage processing to facilitate conserving the power resources of the mobile device.

In particular, performing a plurality of processing stages to process the acoustic input comprises performing at least one first processing stage (act 422) prior to performing at least one second processing stage (act 424). The at least one first processing stage may include one or more stages designed to determine whether the acoustic input may potentially include a voice command, or conclude that the acoustic input corresponds to spurious acoustic activity. If the at least one first processing stage determines that the acoustic input corresponds to spurious acoustic activity, further processing of the acoustic input may be terminated and further acoustic input received from monitoring the acoustic environment evaluated (e.g., a voice response system may return to or continue to perform act 410).

Otherwise, if the at least one first processing stage is not able to conclude that the acoustic input corresponds to spurious acoustic activity, at least one second processing stage may be performed to assess whether the acoustic input includes a voice command, or corresponds to spurious acoustic activity. The at least one second processing stage may include one or more processing stages configured to conclude whether the acoustic input includes a voice command, or instead corresponds to spurious acoustic activity. If the at least one second processing stage determines that acoustic input includes a voice command, processes to respond to the voice command may be initiated (act 430). For example, if the acoustic input is determined to include an explicit voice trigger, the voice response system may be readied to expect one or more voice commands to act upon. If the acoustic input includes an actionable voice command, initiation of the processes to perform the actions needed to respond to the voice command may be invoked.

According to some embodiments, the at least one first processing stage comprises one or more relatively low power processing stages, and the at least one second processing stage comprises one or more generally higher power processing stages. In this manner, the processing stages that require more processing power may be reserved for circumstances where the at least one relatively low power processing stage is not able to conclude that the acoustic input corresponds to spurious acoustic activity so that further evaluation may be necessary.

According to some embodiments, the at least one first processing stage comprises one or more VAD processing stages configured to determine whether the acoustic input likely contains voice content or whether the acoustic input more likely contains non-speech acoustic activity. The at least one second processing stage may include one or more speech processing stages configured to determine the content of the speech and/or the meaning of the speech assessed as being present in the acoustic input by the one or more VAD processing stages. In this manner, speech processing stages may be reserved for acoustic input assessed as including voice content, thus conserving power to an extent reasonable by first detecting the presence of speech before determining its content. Some exemplary VAD and speech processing stages are discussed in further detail below.

According to some embodiments, the at least one first processing stage is performed on a secondary processor (e.g., a relatively low power digital signal processor (DSP) on the mobile device) and the at least one second processing stage is performed on a primary processor (e.g., a main central processing unit (CPU) of the mobile device). In this manner, the secondary processor may be able to dispense with some appreciable percentage of the received acoustic input without having to engage the primary processor, thus conserving power resources and allocating them on an as-needed basis. This may be particularly useful when the mobile device is operating in a low power mode wherein the primary processor is powered down or at least partially disabled or deactivated. Thus, monitoring the acoustic environment may be achieved without having to frequently wake-up relatively power intensive components of the mobile device to evaluate whether a voice command has been received.

The above described examples of multi-stage processing may facilitate the implementation of an "always-on" voice response system that can monitor and respond to voice commands while generally minimizing power consumption, both when the mobile device is active and/or when the mobile device is in a low power mode (where reducing power consumption may be or perceived to be more critical or important by a user). Some exemplary processing stages that may be used to implement multi-stage voice response/activation are described below, though aspects related to monitoring acoustic input and evaluating whether the acoustic input includes a voice command are not limited to the examples provided herein, nor are any particular processing stages required as any one or combination of processing stages may be suitable for implementing an "always-on" voice response system.

When a mobile device is operating in a low power mode, the voice response system may transition the mobile device from the low power mode to an active mode in a number of ways. In general, the voice response system may be configured to keep as many components in a low power mode as possible to reduce the impact on the battery of the mobile device. As such, the voice response system may incrementally or progressively transition the mobile device from a low power mode to an active mode by activating resources only as needed. For example, the voice response system may activate a secondary processor to perform one or more processing stages while leaving the primary processor in a low power mode until and/or unless the primary processor is needed.

One or more processors may include a low power state whereby certain processes may be executed without fully activating the processor (e.g., one or more low power clocks may allow for low power operation), and the voice response system may utilize such low power operating states to the extent possible before bringing the processor to a full power state or otherwise rendering the processor fully operational. Some components, such as the display, may remain in low power mode until the voice response system is confident acoustic input includes a voice command. It should be appreciated that there are many suitable approaches for transitioning a mobile device from a low power mode to an active mode, either progressively or more instantaneously, and the manner in which wake-up of a mobile device is performed may rely on the processing strategy used to determine whether acoustic input includes a voice command.

It should be appreciated that incremental or staged wake-up may also include progressive wake-up of other components on the mobile device (e.g., components other than the one or more processors) as appropriate. For example, a mobile device may include multiple microphones to monitor the acoustic environment of the mobile device. When operating in a low power mode, one or more of the microphones may be powered down or turned off to conserver power, while at least one microphone remains at least partially on so as to continue to monitor the acoustic environment to receive acoustic input when the mobile device is operating in a low power mode. When the voice response system determines that the acoustic input likely includes speech and/or a voice command, the voice response system may turn on one or more additional microphones.

It should be appreciated that the processing stage at which additional microphone(s) are activated is not limited to any particular stage in the processing. For example, the voice response system may activate one or more additional microphones when one or more VAD processing stages has determined that the acoustic input likely contains speech. The voice response system may activate one or more additional microphones when an explicit voice trigger is detected, or when one or more keywords has been recognized. Additionally, one or more additional microphones may be activated after relatively early processing determines that the acoustic input exceeds certain low level threshold inquiries such as amplitude, duration, energy, etc. Accordingly, any of the processing stages described herein may trigger activating one or more additional microphones, as the aspects are not limited in this respect.

Any of a variety of mobile device components capable of providing one or more contextual cues may also be activated as part of a staged or incremental wake-up when the mobile device is operating in a low power mode including, but not limited to, a GPS system, an accelerometer, or a clock to provide location information, motion information and time of day, respectively. Any of various system resources may be activated to, for example, check for recent activity, check for an occurrence of an event, check the battery power, etc. to incrementally wake-up portions of the mobile device on an as-needed basis. Network components may also be activated in a staged wake-up when the mobile device is operating in a low power mode. As discussed above, one or more processing stages may involve transmitting at least a portion of the acoustic input over the network to be processed by one or more network servers, and the network transceiver and/or other components needed to communicate with an appropriate network may be activated while the mobile device is operating in a low power mode. Thus, network resources such as ASR and/or NLP resources may be utilized while the mobile device otherwise remains in a low power mode.

There are a number and variety of processing stages that may be used to assist in deciding whether acoustic input received by a mobile device includes a voice command or corresponds to spurious acoustic activity. Following below are descriptions of some non-limiting examples of processing stages that may be used alone or in any combination in a processing strategy for detecting when a voice command has been spoken. Other processing stages beside the illustrative processing stages described herein may be used, as the aspects are not limited in this respect.

A first class of processing stages that may be utilized include VAD processing stages configured to detect the presence of voice content in acoustic input. For example, audio signals receiving from one or more microphones in response to acoustic activity in the environment may be processed to determine if the audio signals contain voice content. Performing one or more VAD processing stages may include evaluating the amplitude of the audio signal generated by the microphone. It is often the case that a user uttering a voice command will speak at least at some minimal volume in the vicinity of the mobile device such that low amplitude audio signals below a given threshold may be regarded as acoustic input arising from background or ambient acoustic activity. Alternatively or in addition to, the duration of acoustic activity may be evaluated to rule out spikes of acoustic activity or other acoustic activity of a duration too brief to likely correspond to speech.

VAD processing stage(s) may also include evaluation of the acoustic input to assess whether the acoustic input is characteristic of speech. For example, the energy of acoustic input received by a microphone on the mobile device may be evaluated to assess whether the energy content is suggestive of speech. Spectral slope analysis, evaluation of signal periodicity, cepstral analysis, or any other technique that evaluates one or more properties of the acoustic input to determine whether the acoustic input is characteristic of speech. VAD processing stages may include analyzing the acoustic input for phoneme content to determine the likelihood that the acoustic input includes speech. For example, one or more VAD processing stages may utilize a limited number of stored phoneme models (or a complete set) and compare the acoustic input to the phoneme models to evaluate whether the acoustic input has phonemic content. For example, if portions of the acoustic input match one or more of the phoneme models utilized, it may be ascertained that the acoustic input likely includes phonemic content characteristic of speech.

The confidence such a processing stage has that acoustic input includes phonemic content, and thus that the acoustic input include voice content, may relate to how well portions of the acoustic input match the set of phoneme models utilized and/or how many matches can be found. To reduce the amount of processing required, one or more such processing stages may be configured to conclude that voice content is present when a certain number of matches are found and/or the quality of one or more matches are sufficient to strongly suggest speech, discontinuing further processing in this respect. One or more phone loop techniques may be used to ascertain the phonemic content of the acoustic input. Such phonemic processing may be performed relatively inexpensively as a precursor to ASR and using less computing power than required to recognize words. According to some embodiments, results of phoneme analysis may be propagated to subsequent ASR processing stages.

In embodiments that include one or more VAD processing stages, the processing stages may be performed in sequence (e.g., a low level amplitude check may be performed as a threshold inquiry, followed by one or more evaluations of the audio signal characteristics if the amplitude is sufficient to suggest it may be associated with voice), in parallel (e.g., one or more signal characteristic processing stages may be performed relatively simultaneously or as part of the same processing stage, and the results may together be evaluated to assess whether the acoustic input is suggestive of speech), or a combination of both. According to some embodiments, one or more VAD processing stages may be utilized to determine whether it is believed that acoustic input contains speech, and if not, further processing of the acoustic input may be terminated.

Another class of processing stages that may be performed to determine whether acoustic input includes a voice command are speech processing stages, which herein refer to processing stages that evaluate or assess the content of speech contained in an acoustic input (e.g., as opposed to determining whether it is believed voice content is present, as performed by typical VAD processing stages). Evaluating the content of acoustic input may include, but is not limited to, automatic speech recognition (ASR) (e.g., determining what words are present in an acoustic input containing speech), classification (e.g., categorizing speech), language understanding (e.g., ascertaining the semantic content of speech) and/or speaker verification (e.g., determining whether speech was uttered by a particular speaker), further details of which are discussed below. Speech processing stages may be used in any number and in any combination, as the aspects are not limited in this respect.

Limited vocabulary ASR is one example of speech processing that may be suitable in determining whether a voice command has been spoken. As a general principle, the processing required to recognize speech increases as the size of the vocabulary of words that can be recognized increases. Accordingly, using a restricted vocabulary may allow for ASR to be performed quickly and efficiently while consuming relatively little power.

Limited vocabulary ASR may be used to perform explicit voice trigger detection. For example, an exemplary speech processing stage may include performing ASR using a vocabulary restricted to the words in the explicit voice trigger phrase (which may include as few as a single word). For example, for the explicit voice trigger "Hello, Dragon," the vocabulary may be restricted to the two words "Hello" and "Dragon." By limiting the vocabulary to the words permitted in an explicit voice trigger, ASR may be performed using little processing to assess whether the acoustic input includes a voice command (e.g., whether the acoustic input includes the explicit voice trigger).

Limited vocabulary ASR may also be used in contexts other than detecting an explicit voice trigger, alternatively or in addition to explicit voice trigger detection. For example, limited vocabulary ASR may be performed using a restricted vocabulary having a desired number of key words that are frequently uttered people when speaking a voice command. For example, terms such as "what," "where," "how," etc., may be frequently used when speaking a voice query. Action words such as "search," "schedule," "locate," "call," "contact," "remind," etc., may also be common words uttered when speaking a voice command. It should be appreciated that any word deemed suggestive of a voice command may be included the limited vocabulary to facilitate relatively fast, relatively low power ASR to obtain information about whether acoustic input includes a voice command.

A limited vocabulary in this respect may also be built, learned or modified based on a user's behavior. For example, words spoken by a user in past voice commands may be added to a limited vocabulary. According to some embodiments, the words spoken by a user in voice commands recognized as such may be stored and each time a given word is again spoken by the user, the use count for that word may be incremented. The time at which a given word is spoken may also be recorded so that frequency of use may be determined. In this manner, a record of how many times and/or how frequently a user speaks particular words when uttering voice commands may be obtained. When a word that does not appear in the limited vocabulary reaches some threshold count and/or is spoken frequently enough (e.g., spoken enough times within a given interval of time), the word may be included in the limited vocabulary. One or more words included in the limited vocabulary may be removed if it is determined that a user does not use them regularly or at all when speaking voice commands. Other suitable techniques may be used to modify a limited vocabulary based on a user's behavior to generally tailor the limited vocabulary to the user, as this concept is not limited to any particular technique or set of techniques.

According to some embodiments, limited vocabulary ASR may be followed by more comprehensive ASR (e.g., large vocabulary ASR, generally unrestricted ASR, etc.). For example, limited vocabulary ASR may detect that an explicit voice trigger was uttered and invoke more comprehensive ASR to recognize other words present in the acoustic input, or to recognize words present in acoustic input received subsequent to detecting the explicit voice trigger. According to some embodiments, limited ASR may be used to recognize one or more key words suggestive of a voice command and, if it is determined that the recognized word(s) provide sufficient evidence of a voice command, more comprehensive ASR may be performed to recognize the remainder of the speech contained in the acoustic input, either to confirm that a voice command is present or to prepare for responding to a voice command, or both.

According to some embodiments, generally unrestricted ASR (e.g., ASR performed without restricting or limiting the available vocabulary of the ASR component located on the mobile device) may be performed without first performing limited vocabulary ASR, as the aspects are not limited in this respect. Speech processing stages may also include utilizing ASR resources not available on the mobile device. For example, some embodiments include a speech processing stage that transmits the acoustic input wirelessly to a network where it can be recognized using a desired ASR component, for example, located on one or more servers connected to the network. This may allow for relatively computationally expensive ASR to be performed without incurring these processing costs on the mobile device itself. Limited ASR may also be performed on a network server instead of on the mobile device, as the use of local or network resources is not limited to any particular processing stage. In general, any one or combination of ASR processing stages may be utilized to assist in determining whether acoustic input includes a voice command.

Speech processing stages that may be utilized to evaluate whether a voice command has been spoken include one or more statistical classification stages to categorize the acoustic input as either corresponding or not corresponding to a voice command. Any type of statistical classifier may utilized and in any combination, including but not limited to binary or multiclass classification, linear classifiers, hidden Markov models (HMMs), Bayesian networks, support vector machines, neural networks, decision trees, etc. According to some embodiments, training data is utilized to cluster utterances into classes (e.g., voice commands and speech that does not correspond to a voice commands). Words recognized in acoustic input may be compared to the trained clusters to classify the utterance as either likely being associated with a voice command or likely not.

Such classification may be a binary decision, or the classifier (e.g., clusters) may include more numerous classifications. According to some embodiments, a binary classification may be used to assess whether speech corresponds to a voice command or not and, when it is determined that speech corresponds to a voice command, further analysis may be performed to understand the content of the voice command (e.g., one or more natural language processing stages may be performed). Alternately, a multiclass classification may be performed to better understand how the voice command should be responded to. Any of numerous suitable statistical classifiers may be used to determine whether speech corresponds to a voice command or not, and statistical classifier processing stages are not limited to any one, particular or combination of techniques.

Speech processing stages that may be utilized to evaluate the content of input also include one or more natural language processing stages to ascertain the semantic meaning of speech recognized using one or more ASR processing stages. NLP stages may be used either to evaluate whether speech contained in acoustic input corresponds to a voice command, or to determine the meaning of the voice command and/or intent of the user so that the voice command can be carried out.

It should be appreciated that any processing stage configured to evaluate whether acoustic input includes a voice command (e.g., any of the exemplary processing stages described herein) may be performed on the mobile device or remotely via a network connection to one or more network servers). In some circumstances, delegating one or more processing stages to network resources may further generally optimizing false positive and false negative rates while generally minimizing power consumption and/or may bring to bear resources not available on the mobile device.

As discussed above, generally optimizing false positive and false negative rates to ensure that a mobile device is perceived as responsive to voice commands, while avoiding too frequently attempting to respond to spurious acoustic activity may be a consideration when implementing "always-on" functionality. This may have increased importance when the mobile device is operating in a low power mode where unnecessarily waking-up the mobile device may not only be particularly frustrating for the user from the perspective of loss of battery power, but may become annoying to the user who may then prefer to disable this functionality.

The inventors have appreciated that considering one or more contextual cues may improve false positive and/or false negative rates. In particular, the inventors have appreciated that considering other factors other than the content of received acoustic input may improve accurately detecting whether the acoustic input includes a voice command when used in conjunction with techniques for evaluating the acoustic input itself (e.g., in conjunction with any of the above described processing stages and techniques).

Figure 5:
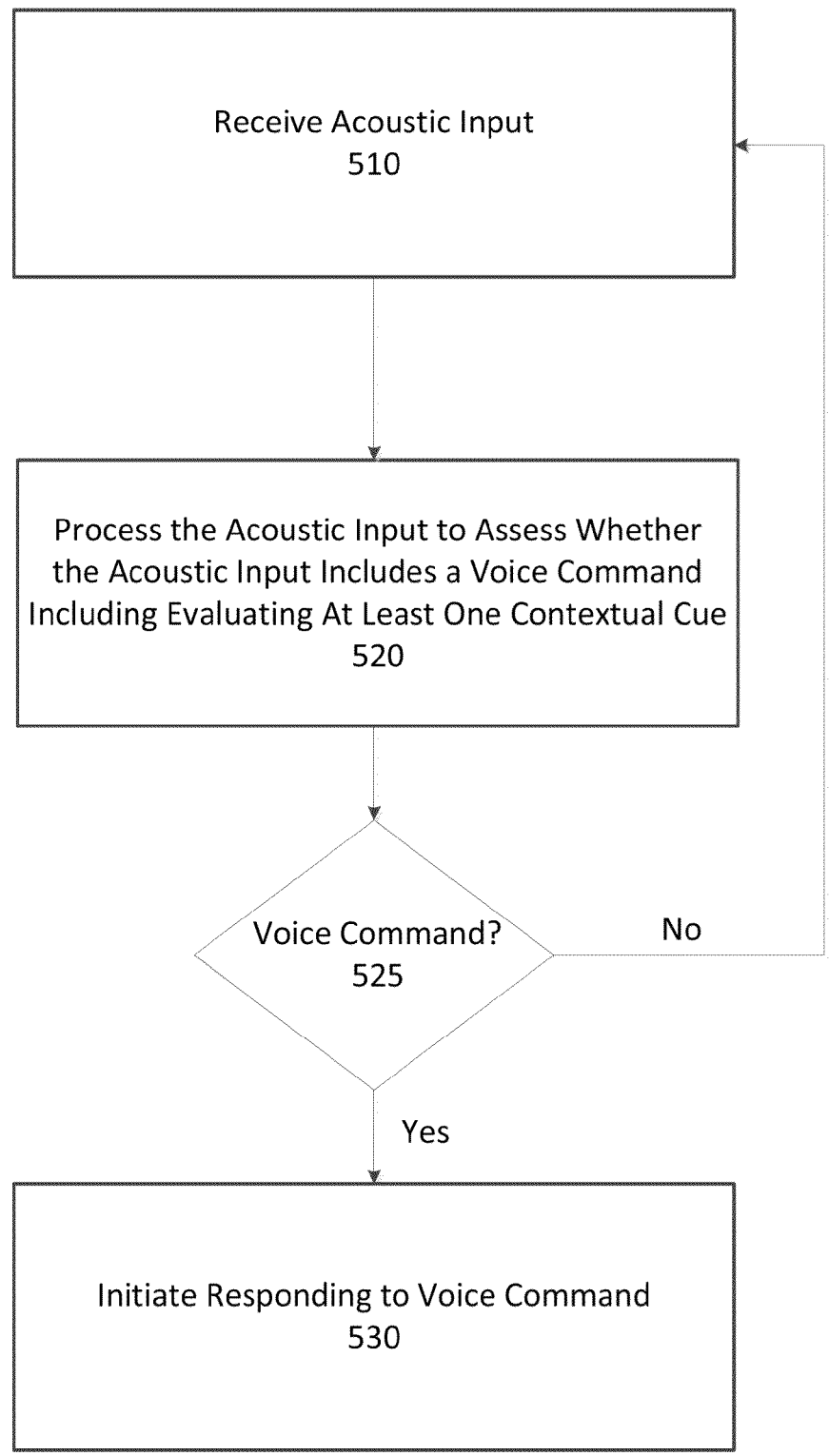
FIG. 5 is a flow chart illustrating a method for determining whether acoustic input received from the environment of a mobile device includes a voice command using at least one contextual cue, in accordance with some embodiments.

FIG. 5 illustrates a method of using at least one contextual cue to assist in determining whether acoustic input includes a voice command. Method 500 may be similar in some respects to methods 200, 300 or 400 in that acoustic information is obtained (510) and then processed in some manner to evaluate whether the acoustic input includes a voice command (e.g., using any one or combination of techniques described herein). In act 520, at least one contextual cue is used to assist in determining whether the acoustic input includes a voice command. Example contextual cues include, but are not limited to, the time of day, the location of the mobile device, motion of the mobile device, recent activity on the mobile device, biometric information, status of the power source, information about the acoustic environment, etc., further details of which are provided below.

Contextual cues may be used in numerous ways to influence the determination of whether acoustic input includes a voice command. For example, one or more contextual cues may increase or decrease a confidence value associated with one or more processing stages. As illustration, movement of the mobile device may influence the decisions of one or more VAD processing stages when it is suggestive of a user having picked up the mobile device, as such action may indicate that proximately received acoustic input includes voice content.

Contextual cues may be used to determine which processing stages are performed and in what order (e.g., the selection and/or sequence of processing stages may be based, at least in part, on evaluating one or more contextual cues). For example, a location cue indicating that the mobile device is located in a vehicle may be used to initiate a particular noise cancellation processing stage that would not otherwise be performed if the mobile device is determined to be located in the office or home or other location having a different acoustic profile. A low battery condition may be used to favor selection of specific (or additional) low power processing stages and/or discourage selection of higher power processing stages. In some instances, one or more contextual cues may be used to terminate further processing altogether (e.g., a determination that received speech was not uttered by the user of the mobile device may trigger ceasing further processing). Additionally, a contextual cue may be used to initiate obtaining one or more other contextual cues. Contextual cues may be used in any suitable way to assist in determining and/or influencing the evaluation of whether an acoustic input includes a voice command, as the aspects are not limited in this respect.

Following below are more detailed descriptions of various exemplary contextual cues. Examples of specific contextual cues are provided herein for illustrative purposes as any contextual cue may be utilized in any suitable combination and are not limited to the type or combinations explicitly described herein.

The inventors have appreciated that the time of day may be an indicator of whether acoustic input includes a voice command, and that the time in which acoustic input was received may be used to influence the evaluation of whether the user has uttered a voice command. For example, acoustic input received when people normally are sleeping may suggest that the acoustic input does not include a voice command. This information may be used to discourage activating the voice response system unless other indicators suggest more strongly that the acoustic input in fact does include a voice command. Acoustic input received at other times of day may suggest that it is more likely that the acoustic input includes a voice command, and this information may be used to influence the evaluation (e.g., to bias the decision as to whether a voice command has been uttered to some desired extent).

According to some embodiments, the system may record the time of day that a given user has uttered voice commands in the past. By doing so, a distribution of when a particular user has issued voice commands can be compiled. Such a distribution indicates when a user is more and less likely to issue voice commands. As such, when acoustic input is received, the time may be obtained and compared to the distribution to see whether receipt of the acoustic input corresponds to a time when the user frequently or infrequently utters voice commands. This comparison may be used to influence the determination of whether the acoustic input likely includes a voice command.

As an example, if the time of receipt of the acoustic input corresponds generally to a time of day when the user frequently utter voice commands, the determination may be biased towards finding a voice command to a desired extent (e.g., in proportion to how frequently the user utters voice command at the current time of day). On the other hand, if the current time corresponds to a time of day when the user infrequently utters voice commands, the comparison may be used to influence the evaluation to discourage, to an extent desired, the conclusion that the acoustic input includes a voice command. It should be appreciated that a history of the times of past voice commands may be collected and utilized in other ways to influence the determination of whether acoustic input includes a voice command, or historical data may not be utilized, as such techniques are not limited in this respect.

According to some embodiments, the voice response system may obtain the current time when acoustic input is received and access a user's calendar to check whether the user may have an appointment, meeting or event scheduled that would make it more or less likely that the user would be uttering a voice command. The voice response system may be capable of accessing a calendar or schedule that allows the user to specify certain times when the user does not want "always-on" functionality to be operational, but would like the mobile device to enable and disable this functionality automatically. Thus, when acoustic input is received, the system may initially check to see if the current time is within an interval of time that the user has indicated that the user would like "always-on" functionality disabled before proceeding with further processing. The time at which acoustic input is received may be utilized in other ways to influence whether a user has uttered a voice command, as the aspects are not limited to the examples described herein.

Many mobile devices are equipped with one or more components that can detect motion of the mobile device, typically by sensing acceleration (e.g., using a gyroscope or other component that responds to acceleration forces). The inventors have appreciated that such motion detectors may be used as a contextual cue to facilitate improved performance with respect to detecting a voice command. For example, users often lift a mobile device or otherwise bring the mobile device closer to their mouth just prior to or concurrent with uttering a voice command, and this action may be used to facilitate improved evaluation of acoustic input. In particular, response from a motion detector can be used as a cue that acoustic input is likely to include a voice command (e.g., when acoustic input is received in close temporal proximity to a response from a motion detector, it may be assumed more likely that the user spoke a voice command).

Motion detector (e.g., accelerometer) response may be incorporated into the evaluation by using motion detector response in conjunction with, to supplement, augment or otherwise influence one or more processing stages (or the results of one or more processing stages) to bias the evaluation in favor of the acoustic input including a voice command. For example, motion response may be used to reduce the threshold of one or more VAD processing stages, relax the requirements of one or more ASR and/or natural language processing stages, provide a vote in favor of the acoustic input including a voice command in a voting scheme, etc. Response from one or more motion detectors may be used in any suitable way to influence the determination of whether acoustic input includes a voice command, as the aspects are not limited in this respect.

Many mobile devices are equipped with location determination capabilities such as GPS. The inventors have appreciated that the location of the mobile device may be used as a cue to influence the determination of whether acoustic input includes a voice command. For example, a user may more frequently issue voice commands while driving then when at the office or home, or vice versa. The voice response system may incorporate this information into evaluating of acoustic input to influence the decision regarding whether a voice command has been spoken. The system may also be configured to be more inclined or more reluctant to conclude that acoustic input includes a voice command in certain locations, independent of how frequently a user utters voice commands in a specific location.

A voice response system may have stored information regarding general areas associated with home, office or other locations such that when the location determination component, such as a GPS, generates coordinates located within these areas, the voice response system can ascertain that the mobile device is located in a known location. With respect to a vehicle, the voice response system may be configured to recognize when the location of the mobile device is changing rapidly and use this information to infer that the mobile device is located in a moving vehicle.

Determining location is not limited to using an electronic component that determines the coordinates of the mobile device, and location of the mobile device may be ascertained through inference using other cues. For example, the voice response system may conclude that the mobile device is presently located in the user's vehicle by detecting connection to a hands free docking station, detecting the presence of a wireless device (e.g., a Bluetooth device) located in the vehicle, or determining that the mobile device is capable of communicating with one or more of the vehicle's on-board systems. The voice response system may also ascertain that the mobile device is located in a particular location by detecting the presence of a wireless access point (e.g., the user's home network, office LAN, etc.).

Techniques that generally infer the location of the mobile device due to proximity, connection and/or ability to communicate with other devices, components and/or networks may be used to ascertain the mobile device's location wherever suitable and wherever such inferences can be made, as the aspects are not limited in this respect. In general, location may be used in any of a variety of ways to assist in determining whether acoustic input includes a voice command, as the aspects are not limited in this respect.

According to some embodiments, the voice response system may learn a user's behavior regarding where the user is most likely to speak a voice command. For example, when it has been determined that the user has spoken a voice command, the location may be recorded and a distribution obtained that captures where the user frequently utters voice commands. When acoustic input is received, a present location of the mobile device may be compared to this distribution to either bias in favor of or discourage the determination that the acoustic input includes a voice command based on whether the mobile device is located where a user frequently or infrequently speaks voice commands. Other techniques for learning a user's habits with respect to uttering voice commands may be used, as the aspects are not limited in this respect.

The occurrence of an event and/or recent activity on the mobile device may be used as a contextual cue to influence the decision regarding whether acoustic input includes a voice command. For example, certain events on a mobile device may be likely to trigger a voice response from the user. For example, when an alarm on the mobile device goes off, a user may be interested in addressing the alarm via voice commands such as "Snooze alarm," "Turn alarm off," or a command to set the alarm for a later time (e.g., "Set alarm for 8 o'clock," "Set alarm for an hour from now," etc.). After a calendar alert has activated, the user may be inclined to take some sort of action such as "Show me my Calendar," or in response to a reminder to call John, the user may instruct the mobile device to "Call John Doe," to initiate a telephone call. In response to an incoming telephone call, the user may want to handle the interaction via voice with instructions such as "Answer call," "Send to voicemail," "Mute phone," etc. A user may want to respond via voice when a text is received by commanding the mobile device to "Respond to latest text," or may want to respond to an alert that a voicemail was just received by speaking the command "Listen to voicemail."

A user's own activity on a mobile device may also be used to influence a decision about whether acoustic input includes a voice command. For example, if a user opens a text or email, the user may indicate the desire to speak the information by commanding the mobile device to "Take dictation." Opening a calendar or scheduling application make be cue that the user may want to schedule something using voice (e.g., "Schedule lunch with Jane at noon tomorrow"). In addition, how recently a user interacted with a mobile device may also be considered as a contextual cue. For example, the length of time since the user last activated the mobile device, how long ago the user last uttered a voice command, how long ago the user performed one or more tasks on the mobile device, etc., may also be considered as a contextual cue to influence the evaluation of one or more processing stages.

The above described events and activities are merely exemplary and any event or combination of events or activity on the mobile device may be used as a contextual cue. The term event information is used herein to describe information obtained about an event occurring on the mobile device and recent activity enacted on the mobile device. Thus, according to some embodiments, a voice response system monitors one or more events and/or recent activity on the mobile device and uses event information obtained as a result to influence the evaluation of acoustic input received proximate in time to the event information. Event information may be utilized to either bias in favor or discourage a determination that acoustic input includes a voice command.

As discussed above, conserving power may be an important consideration when implementing "always-on" functionality. Accordingly, in some embodiments, remaining battery power may be used to assist in the optimal selection of processing stages and/or in choosing what order the processing stages should be performed. For example, if the mobile device has sufficient battery power (e.g., the mobile device has been recently charged), the voice response system may be willing to consume more power to achieve lower false positive and/or false negative rates. As such, the choice of processing stages may be selected to achieve this result. However, when battery power is low, power conservation may become increasingly important. In such circumstances, an indication of a low battery state may be used to discourage passing acoustic information on for further processing such that additional power consumption is incurred only in situations where the confidence is very high that the acoustic input includes a voice command (e.g., this may be achieved by modifying thresholds in one or more processing stages when a low battery condition is detected).

Furthermore, if the system detects that the mobile device is plugged into a power source such that the choice of processing stages is generally not or significantly less constrained with respect to power consumption, the voice response system may select processing stages that generally will determine whether there is a voice command with the best accuracy, while relaxing constraints on the amount of processing power used to make the determination.

The acoustic environment of the mobile device may also be used as a contextual cue. For example, when acoustic input has been received and assessed as resulting from spurious acoustic activity, the acoustic input may be stored as acoustic information reflecting the acoustic environment and later referenced to assist in evaluating subsequently obtained acoustic input. According to some embodiments, the stored acoustic information, or information derived therefrom (e.g., spectral information, salient components believed to correspond to noise, etc.) may be compared to or subtracted from received acoustic input to eliminate at least portions of the background acoustic environment. The acoustic information may also be obtained by periodically sampling the acoustic environment to obtain information that can be processed and stored as a reference with respect to the acoustic environment of the mobile device. Acoustic information regarding the environment may also be used to determine a location of the mobile device by comparing acoustic information to stored templates of environments in which the mobile device is frequently located (e.g., a car).

Voice has been used as a biometric signature to facilitate verifying or authenticating the identity of a speaker electronically. Techniques for performing such speaker recognition often utilize a stored "voice print" of the speaker which can be compared to a received audio signal to assess whether the characteristics of the audio signal match those captured by the voice print. A voice print is typically comprised of one or more characteristics that have a facility for distinguishing one speaker from another. When acoustic input is received, one or more characteristics may be extracted and compared to the voice print to assess whether it is believed the acoustic input came from the same speaker from which the voice print was obtained.

Speaker recognition techniques may be used as part of the process of determining whether acoustic input includes an actionable voice command. According to some embodiments, the voice response system may be configured to respond only to voice commands spoken by a particular user of the mobile device (e.g., the owner). As such, when acoustic input has been determined to likely contain speech (e.g., using one or more VAD techniques), the acoustic input may undergo speaker recognition to determination whether the speech came from the user or from one or more other speakers. The system may be configured to disregard the acoustic input if it is determined that it did not originate from the specific user, whether it includes a voice command or not. In some embodiments in which the system is capable of performing speaker recognition, this capability may be enabled and disabled by the user to allow for other speakers to speak voice commands that can be acted upon.

Mobile devices may include multiple microphones. Such configurations may be utilized to compute the direction from which a given user is speaking. For example, time delay of arrival (TDOA) techniques may be used to compute the direction from which a given user is speaking based, at least in part, on the delay between the times a user's speech is received at two different microphones on the mobile device, provided there is some sufficient distance between the microphones on the mobile device. For example, transducers 130 in FIG. 1A may include at least one microphone located on the upper portion and on the lower portion to provide a spread sufficient to perform TDOA computations.

When a given user speaks, the direction from which the speech is incoming may be computed. It should be appreciated that any technique may be used to compute a direction of the user, as there are no limitations in this respect. When acoustic input is received by the mobile device, the direction of the acoustic information may be computed and compared to the stored direction. If the acoustic input is arriving from a different direction, the voice response system may disregard the acoustic input as not including a voice command from the given user. Alternatively or in addition to, the stored direction may be used to filter out acoustic information received from other directions such that acoustic input includes more signal from the general direction of the user to improve subsequent processing of the acoustic input.

It should be appreciated that the above described contextual and other cues are merely exemplary and other contextual cues or cues of a different nature may be used to assist in detecting a voice command by influencing the evaluation of acoustic input received from the acoustic environment of the mobile device, as the aspects are not limited for use with any particular contextual cue or combination of contextual cues. Contextual cues may be used at any stage of processing where information that suggests an acoustic input is more or less likely to include a voice command may be useful.

FIG. 1D illustrates an example configuration of system components internal to a mobile device, such as mobile device 100 illustrated in FIG. 1A. Exemplary system components of a mobile device may include a primary processor 115, a secondary processor 125 and an audio codec 105, all illustrated for convenience and clarity of illustration as being interconnected via a common bus 155. It should be appreciated that a given mobile device may include more or fewer processing components interconnected in any of numerous ways using any type of interconnection, and the particular configuration illustrated in FIG. 1D is provided to demonstrate some concepts related to generally low power "always-on" functionality, in accordance with some embodiments.

It should be appreciated that any of the techniques described herein may be implemented on a mobile device having a single processor (or performed on a single processor even when multiple processors are available), and the following discussion with respect to FIG. 1D is provided to describe exemplary techniques for exploiting the processing capabilities of mobile devices that have multiple processors. As such, the configuration in FIG. 1D is used merely to illustrate a mobile device having a primary and secondary processor that are capable of processing information and of exchanging information via some type of interconnection or series of interconnections or couplings and not to limit the type of mobile device on which techniques described herein may be implemented. Techniques described herein with respect to monitoring the acoustic environment of a mobile device to detect voice commands may be used with any suitable system configuration having any number of processing components interconnected in any suitable manner.

Processor 115 may be the system's primary or main processor and generally operates as the central processing unit for the mobile device and, therefore may include a high speed processor that may consume relatively large amounts of power when operating (e.g., when the clock tree is enabled and the processor is executing instructions). Accordingly, when a mobile device enters a low power mode (e.g., powers down into a sleep or idle mode), the primary processor may be powered down to a desired extent (e.g., one or more clocks in the clock tree may be disabled to conserve power). When the mobile device wakes-up (e.g., enters an active mode), the primary processor may be activated or powered up to perform processing tasks that are needed.

Processor 125 may be a secondary processor such as a digital signal processor (DSP), co-processor and/or specialized processor to handle some portion or aspect of the processing tasks performed by the mobile device, to assist the primary processor in performing certain functionality, to handle certain specialized processing tasks, etc. For example, the secondary processor may include a digital signal processor configured to process signals from one or more wireless communications components 160, for example, to handle at least some processing involved in a cellular communications. The secondary processor may include a coprocessor of the primary processor or a specialized processor such as a graphics processing unit (GPU) to handle display capabilities.

The secondary processor may be a lower power processor than the primary processor in that less power may consumed by the secondary processor when enabled and executing instructions. In some embodiments, the secondary processor can be configured to operate at a lower power and/or may be simpler and require less power to power-up and/or keep enabled/powered-up, or otherwise be generally attractive from a power standpoint. In some embodiments, it may be simpler, more efficient and/or less power intensive to implement certain processing stages on the secondary processor, or there may be other reasons besides the operating characteristics of the secondary processor that render the secondary processor advantageous from either a power standpoint, an efficiency standpoint, or both.

Figure 6:
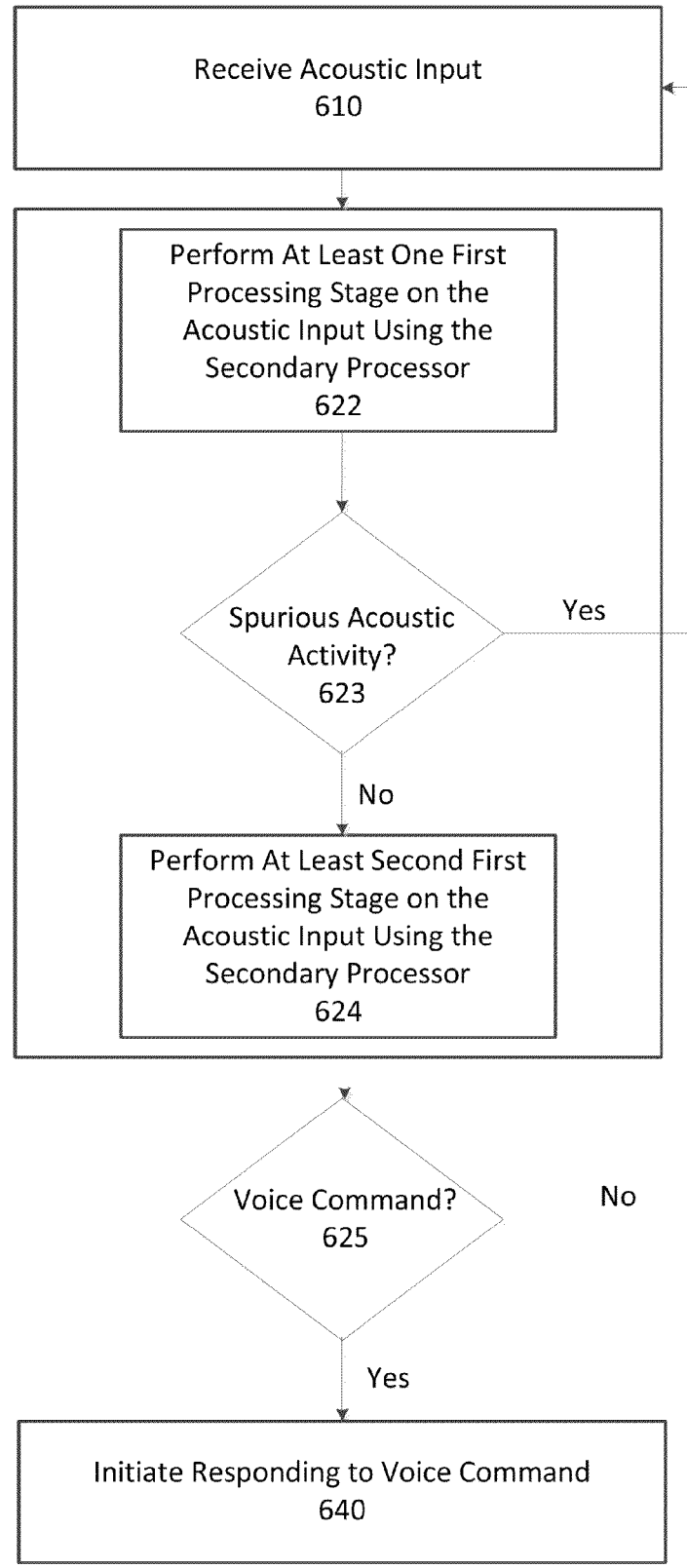
FIG. 6 is a flow chart illustrating a method for determining whether acoustic input received from the environment of a mobile device includes a voice command using multiple processors, in accordance with some embodiments.

As discussed above, the inventors have recognized that utilizing a secondary processor to perform one or more processing stages when determining whether acoustic input includes a voice command may afford lower power "always on" functionality. FIG. 6 illustrates a method of utilizing a system configuration of a mobile device that includes a primary and secondary processor to monitor the acoustic environment to detect voice commands, in accordance with some embodiments. In act 610, the acoustic environment of the mobile device is monitored and acoustic input received. The acoustic input may be processed by one or more components of the mobile device, for example, one or more transducers 130 (e.g., a microphone) may detect acoustic activity and process the acoustic input, audio codec 105 may convert the acoustic input from analog to digital, perform one or more operations on the acoustic input, etc.

In act 622, a secondary processor performs at least one first processing stage on the acoustic input to evaluate whether the acoustic input includes a voice command or likely corresponds to spurious acoustic activity. If after performing the at least one first processing stage, it is determined that the acoustic input corresponds to spurious acoustic activity, the acoustic input may be ignored and further acoustic input may be received for evaluation (e.g., act 610 may be repeated or continue to be performed).

The at least one first processing stage may include one or more VAD processing stages and/or process one or more contextual cues to assess whether the acoustic input is likely to include voice and, if the acoustic input is determined to be the result of spurious acoustic activity, the voice response system may discontinue further processing of the acoustic input. The at least one first processing stage may also include one or more speech processing stages, provided the secondary processor has the processing power and/or functionality implemented to do so. For example, the secondary processor may be configured to perform limited vocabulary ASR on the acoustic input such as detecting an explicit voice trigger or keyword spotting.

By first performing the at least one first processing stage on the secondary processor, it may be possible to rule out substantial amounts of acoustic input without needing to utilize the primary processor. When the mobile device is operating in a low power mode with the primary processor generally inactive or disabled, it may be possible to dispense with appreciable amounts of acoustic input without needing to "wake-up" the primary processor, thus achieving reduction in the power requirements of implementing "always-on" functionality. As such, the primary processor may be reserved for circumstances where additional processing is required to evaluate the acoustic input (e.g., when the secondary processor cannot itself reach a conclusion with enough certainty).

In embodiments that check for explicit voice triggers, and wherein the secondary processor is configured to perform such explicit voice trigger detection, it may be determined that acoustic input includes a voice command without engaging the primary processor or, if in low power mode, without enabling, activating and/or waking up the primary processor at all. The voice response system may then be readied to process subsequent acoustic input expected to follow the explicit voice trigger, or to further process the acoustic input if it includes an actionable voice command in addition to the explicit voice trigger. The further processing may engage the primary processor to assist in understanding the voice command and/or to carry out the directives of the voice command.

In act 624, if after performing the one or more first processing stages, it cannot be concluded that the acoustic input corresponds to spurious acoustic activity (act 623), at least one second processing stage may be performed on the acoustic input by the primary processor to further evaluate whether the acoustic input includes a voice command. The at least one second processing stage may include one or more processing stages that require more processing power, more complex processing, and/or capabilities or functionality that the secondary processor is not configured to perform. The at least one second processing stage may include one or more speech processing stages that recognize the content of speech in the acoustic input and/or ascertain the semantic content of speech in the acoustic input.

While it may be advantageous to reserve the primary processor for circumstances where the secondary processor cannot reach a conclusion and/or where more computing power, resources or functionality are needed, it should be appreciated that any of the exemplary speech processing stages described above, either alone or in any combination, may be performed by the primary processor to ascertain whether the acoustic input includes a voice command. When it is determined that the acoustic input includes a voice command, further processing needed to respond to the voice command may be initiated (act 640).

According to some embodiments, the at least one first processing stage and/or the at least one second processing stage includes connecting to a network and transmitting at least some of the acoustic input over the network to be processed by one or more servers connected to the network. For example, the acoustic input may be sent to an ASR server to recognize the speech and/or to a natural language understanding server to ascertain the semantic meaning of the acoustic input. While connecting to the network and transmitting the acoustic input over the network consumes power (e.g., when in a low power mode, the appropriate wireless transceiver may need to be activated and the necessary processing components (e.g., a wireless codec) enabled to provide the acoustic input to one or more network servers), once received by the one or more servers, the acoustic input can be processed using network resources without further exhausting the battery power of the mobile device.

Thus, utilizing network resources to perform one or more processing stages may result in a net savings in battery power of the mobile device. That is, in some circumstances, utilizing the computing resources of the network may justify incurring the power consumption needed to transmit the acoustic input over the network and receive relevant results back (e.g., the power savings resulting from utilizing network resources may justify the processing power needed to connect and maintain a network communication). Network resources may be utilized to perform one or more processing stages on the acoustic input when the mobile device is operating in an active mode, when the mobile device is operating in a low power mode, or both. In an active mode, the components needed to perform the network communication may already be active and the overhead in this respect may be relatively minimal. When in a low power mode, the voice response system may activate only those components needed to perform the network communication and allow the remainder of the components that have been powered down to remain in a low power mode to limit the power consumption to the extent possible.

While it may be advantageous in many circumstances to perform certain processing stages on the mobile device (e.g., one or more VAD processing stages and/or limited vocabulary ASR) and utilize network resources for more computationally intensive processing stages such as more complex ASR and/or NLP, there are no limitations in this respect, and acoustic input may be transmitted over the network at any stage of processing and network resources may be utilized to perform any one or combination of processing stages suitable for a given processing strategy.

According to some embodiments, one or more VAD processing stages are performed on the secondary processor and, if voice is detected, the primary processor is engaged to perform one or more speech processing stages. It should be appreciated that while, from a power standpoint, it may be advantageous to perform VAD processing stages on the secondary processor, one or more VAD processing stages may be performed on the primary processor, as the aspects of utilizing two or more processors is not limited to performing any particular processing stage or combination of processing stages on the secondary processor or the primary processor.

The secondary processor may be utilized in any suitable manner to implement a processing strategy that facilitates achieving relatively low power "always-on" functionality while having satisfactory false positive and false negative rates. Some processing strategies may be guided by the principal that further processing of acoustic input should only be performed and/or additional system components engaged or activated only when necessary to reach a conclusion regarding whether the acoustic input includes a voice command or is the result of spurious acoustic activity. However, a secondary and primary processor resources may be utilized in any manner, as the aspects are not limited in this respect.

Figure 7A:
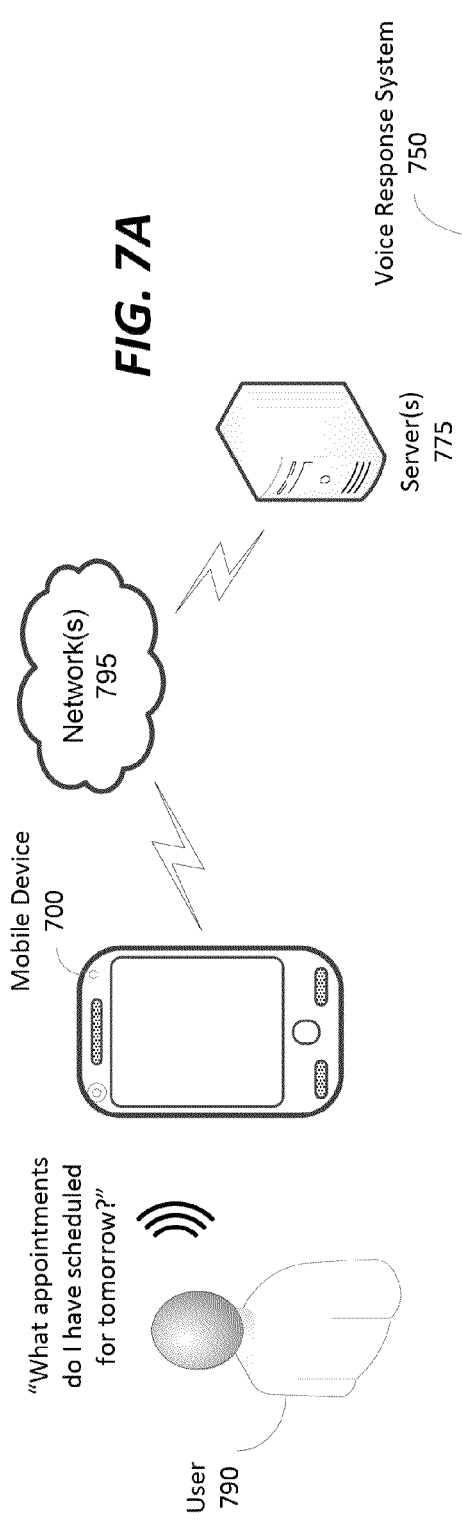
FIGS. 7A and 7B illustrate an example of a voice response system for determining whether acoustic input received from the environment of a mobile device includes a voice command, without requiring an explicit trigger, in accordance with some embodiments.
Figure 7B:
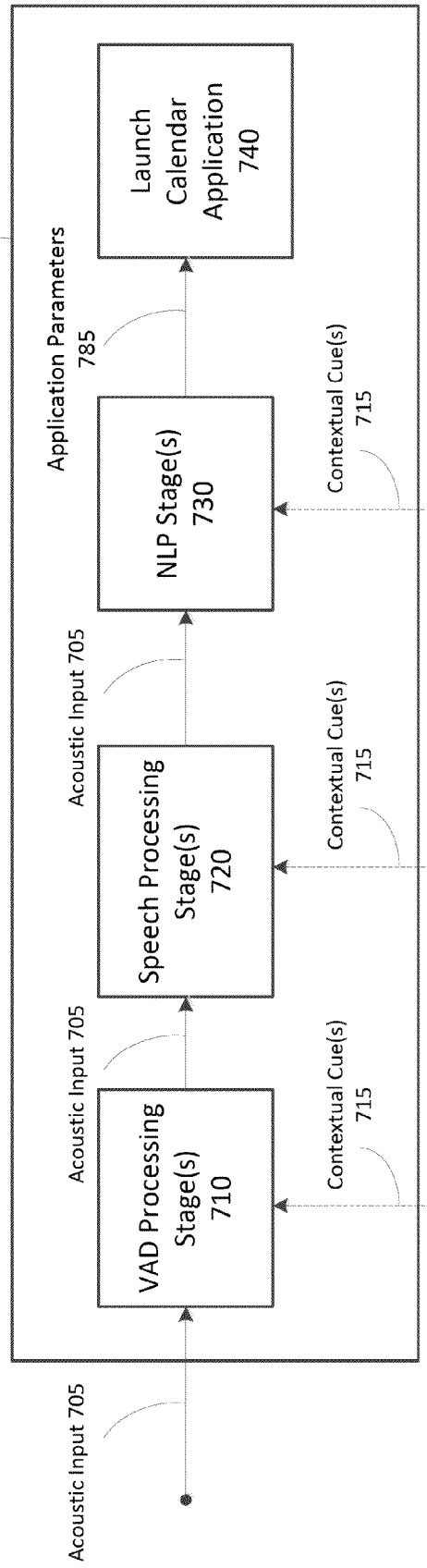

FIGS. 7A and 7B illustrate an example of a voice response system 750 configured to monitor the acoustic environment of a mobile device 700 to receive an acoustic input and determine whether the acoustic input includes a voice command, without requiring the user to speak an explicit voice trigger. In particular, a user 790 may speak the command "What appointments do I have scheduled for tomorrow?" to a mobile device 700 without first needing to alert the voice response system using an explicit voice trigger. According to some embodiments, the voice response system may be responsive to such voice commands (i.e., voice commands spoken without the user uttering an explicit voice trigger) when the mobile device is in an active mode, a low power mode, or both.

Mobile device 700 may be the user's smartphone or other mobile device configured to receive voice input from the user. Mobile device 700 may be capable of connecting to one or more networks 795, including, but not limited to a cellular network, one or more LANs, one or more WANs, the Internet, etc. Voice response system 750 may include hardware, software or a combination of both and is at least partially implemented on the mobile device 700 to monitor the acoustic environment of mobile device 700 to receive acoustic input 705, and determine whether acoustic input 705 includes a voice command, examples of which are shown in FIG. 7B for the exemplary voice command shown in FIG. 7A.

Voice response system 750 may process acoustic input 705 using one or more VAD processing stages 710 to determine whether the acoustic input includes speech content or corresponds to non-speech acoustic activity. As discussed above, VAD processing stages may include any number of processing stages that evaluate properties of the acoustic input to assess whether the properties are characteristic of speech, including but not limited to initial threshold inquiries regarding amplitude, energy and/or duration of the acoustic input, analysis of signal characteristics such as spectrum analysis, periodicity, spectral slope, cepstral analysis, etc.

According to some embodiments, the number and type of VAD processing stages are selected to minimize the number of processing stages needed to either conclude that the acoustic input includes voice content, or conclude that the acoustic input is the result of non-speech acoustic activity. For example, if a given VAD processing stage concludes with sufficiently high confidence that the acoustic input includes voice content, further VAD processing stages may be omitted in favor proceeding directly to one or more speech processing stages to evaluate the content of the speech. If a given VAD processing stage evaluates the likelihood of the acoustic input as being sufficiently low, further processing may be discontinued and the acoustic input categorized as non-speech input.

However, if a given VAD processing stage cannot conclude one way or another, further VAD processing stages may be performed to reach a conclusion as to whether the acoustic input includes voice content or not. The result of a given VAD processing stage may determine which subsequent VAD processing stage is selected. For example, results from certain types of VAD processing stages may suggest which subsequent VAD processing stage should be performed. In this manner, the number, type and order of processing stages may be dynamically determined to facilitate relatively low power VAD processing of the acoustic input. According to some embodiments, multiple VAD processing stages may be performed in parallel and the results from the parallel stages compared to evaluate whether the acoustic input includes voice content. For example, a voting scheme, which may be weighted or not, may be used based on results from multiple VAD processing stages.

In the example illustrated in FIGS. 7A and 7B, VAD processing stage(s) 710 determine that acoustic input 705 includes voice content and the voice response system further evaluates acoustic input 705 using one or more speech processing stages 720 to determine whether the acoustic input includes a voice command. As discussed above, speech processing stages may include ASR, classification (e.g., using one or more statistical classifiers), NLP, etc. For example, according to some embodiments, acoustic input 705 may undergo limited vocabulary ASR to perform keyword spotting, any technique for which may be used to identify whether acoustic input 705 contains any words deemed suggestive of a voice command and/or to identify words needed to perform classification. Other ASR techniques may be utilized depending on the processing strategy being used to recognize one or more words in speech contained in the acoustic input. If no words can be recognized with sufficient confidence, it may be the case that VAD processing stage(s) 710 incorrectly concluded that the acoustic input includes speech. In such an event, the voice response system may discontinue further processing to avoid consuming further power.

When one or more words have been recognized using ASR, the recognized words may undergo classification. At this stage in the processing, acoustic input 705 may include one or more recognized words as a result of performing one or more ASR processing stages, and one or more statistical classifiers may be performed on acoustic input 705 to categorize the acoustic input as corresponding or not corresponding to a voice command based, at least in part, on the one or more recognized words. Other speech processing stages may be utilized, either alternatively or in addition to the exemplary speech processing stages described above, as the aspects are not limited in this respect.

In the exemplary processing sequence in FIG. 7B operating on acoustic input 705, the one or more statistical classifiers may have concluded that the speech in acoustic input 705 corresponds to a voice command. Having so concluded, certain portions of the mobile device may be activated in situations in which the mobile device 700 is operating in low power mode, some exemplary wake-up techniques of which are discussed in connection with FIGS. 8A and 8B below. Generally speaking, essential components of the mobile device needed to efficiently determine the meaning of the voice command and to respond to the directives of the voice command may be engaged or activated pursuant to the determination that acoustic input 705 includes a voice command. However, voice response system wait to activate one or more components of the mobile device 700 until the meaning of the voice command is evaluated to better understand what components may be required to carry out the directives of the voice command.

After concluding that a voice command is present, voice response system 750 may perform NLP stages 730 to evaluate the semantic content of the acoustic input to understand what the user intended the voice response system to do when speaking the voice command. In this respect, the acoustic input may be fully recognized to the extent that previous ASR stages were unable to (or not configured to) fully recognize the speech contained in the acoustic input prior to being processed by NLP stage(s) 730 (or large vocabulary and/or unrestricted ASR may be performed as part of the NLP processing). In the example shown in FIG. 7B, NLP stage(s) 730 may ascertain that the user would like to view his/her calendar to check what appointments are scheduled for tomorrow. As a result, voice response system 750 may check to see what tomorrow's date is and launch a calendar application (see process 740) and pass to the calendar application any appropriate parameters 785, such as tomorrow's date so that the calendar can display the day that the user is interested in and/or list appointments on the calendar scheduled on the indicated date.

In some circumstances, it may be the case that voice response 750 may need further information from the user and may ask the user for further information, or may confirm that the voice command was understood correctly by formulating confirmation speech via speech synthesis and providing the confirmation to the user via one or more speakers on mobile device 700. Voice response system may then proceed upon confirmation from the user. As denoted by the dotted arrows in FIG. 7B, one or more contextual cues 715 may be evaluated at any of the stages of processing to assist in detecting a voice command by influencing the evaluation of one or more processing stages being performed on the acoustic input. As shown in FIG. 7A, mobile device 700 is capable of communicating over network(s) 795 and voice response system 750 may elect to have network resources perform one or more processing stages on the acoustic input. For example, one or more ASR stages and/or one or more NLP stages may be performed by one or more servers 775 connected to network(s) 795.

It should be appreciated that when a voice command is detected and the intent of the command ascertained, the further processing that is initiated will depend on the content of the command and/or the operating mode of the mobile device. When the mobile device is operating in a low power mode, some commands may provoke a transition of the mobile device into an active mode, while other commands may be carried out without further waking up the mobile device. For example, with respect to the latter, some mobile devices are capable of rendering music while in a low power mode. Voice commands such as "next track," "previous track," "repeat track," "pause music," "decrease volume," "increase volume," etc. may be performed without having to exit a low power mode. Thus, the acoustic input may be processed in a low power mode (e.g., where certain components are activated on an "as-needed" basis) to detect the voice command, and the voice command may be carried out without needing to further transition the mobile device into an active mode. In this example, the fact that a music application or player is executing on the mobile device in a low power mode may also operate as a contextual cue to bias the evaluation of the acoustic input to assist in detecting voice commands related to the music player (e.g., the music player being operational may be used to select a processing stage that includes limited vocabulary ASR, wherein the limited vocabulary is selected to include terms frequently associated with controlling a music player such as one or any combination of "track," "volume," "resume," "pause," "repeat," "skip," "shuffle," etc., or any other word or term deemed suggestive of a voice command to control the music player).

According to some embodiments, tasks that the voice response system is configured to respond to may have an associated indication as to whether the mobile device should be transitioned to an active mode when the corresponding task is identified and/or may include information that specifies which components should be activated to perform the corresponding tasks. In this way, the manner in which the voice response system responds to voice commands may be tailored to consume less power by activating the mobile device or some subset of components of the mobile device as needed to perform the one or more tasks or actions that the user intended to be performed.

It should be appreciated that any number of other processing stages not specifically mentioned may be performed alternatively or in addition to, and the type and sequence of stages described in connection with FIG. 7B are merely exemplary. For example, in embodiments that allow explicit voice triggers, explicit voice trigger detection may be performed. In the context of the exemplary voice command illustrated in FIGS. 7A and 7B, explicit voice trigger detection would have failed because the user elected to simply begin speaking a voice command in this particular instance. As such, electing to perform explicit voice trigger detection would have consumed power unnecessarily. Allowing for different modes of operation may help to optimize performance in this respect.

As discussed above, some embodiments determine whether acoustic input includes a voice command without requiring an explicit voice trigger to do so, while some embodiments may require an explicit voice trigger. Embodiments in which an explicit trigger phrase is not required may operate either by evaluating, but no relying on, whether the acoustic input includes an explicit trigger phrase, or by simply foregoing any detection of an explicit voice trigger. For example, embodiments that do not require an explicit voice trigger may still perform one or more processing stages that detect whether an explicit voice trigger is present to more quickly come to a conclusion in the event the user elects to speak an explicit trigger phrase. However, the absence of an explicit trigger phrase would not end the evaluation due to the voice response system's ability to also detect and respond to voice commands even in the absence of an explicit voice trigger. In other embodiments where explicit voice triggers are not required, no processing to detect an explicit voice trigger is performed (e.g., in voice response implementations that do not have or do not consider explicit voice triggers.

There may be advantages and disadvantages to each of the above described capabilities with respect to flexibility and processing strategy. For example, not requiring an explicit voice trigger but allowing for them may provide the user with the greatest flexibility. In particular, the user is free to either engage the voice response system either by uttering an explicit voice trigger or by simply speaking the voice command that the user would like the voice response system to respond to (allowing for explicit voice triggers also provides a user with a more failsafe mechanism to engage the voice response system in the event that implicit wake-up is not responding in a given situation). However, this flexibility may come at the cost of increased processing needed to determine whether acoustic input includes a voice command as the system will likely need to both determine whether an explicit voice trigger has been spoken and perform one or more other processing stages to determine whether acoustic input includes a voice command in the absence of an explicit voice trigger, as discussed in further detail below.

Embodiments that do not require an explicit voice trigger, but also do not allow for explicit voice triggers may perform implicit wake-up more efficiently in this respect because processing stages that evaluate whether an explicit voice trigger has been spoken may be eliminated in favor of processing stages that analyze the acoustic input to detect a voice command by evaluating other characteristics, instead of having to do both. Requiring an explicit voice trigger on the other hand, may provide the most efficient detection of a voice command with generally optimal false positive and false negative rates, but at the cost of potentially impacting the user experience in a negative way by requiring the user to first speak an explicit voice trigger because speaking the command that the user would like carried out.

According to some embodiments, a voice response system may be configured to operate in more than one of the above described ways. By having multiple modes of operation in this respect, the mode that a voice response system operates in may be selected by the user, or selected by the mobile device itself. With respect to the former, in some environments, the user may prefer to operate in one mode or the other. For example, in some circumstances reducing false positives may be more important than reducing false negatives, or vice versa. Also, in some circumstances, battery conservation may be of heightened importance such that the user may prefer the mode that requires the least power consumption. Other factors may also contribute to a user wanting to choose a particular mode, either temporarily, or as a more permanent preference. With respect to the latter, the voice response system may switch between modes automatically according to a schedule (which may be user defined), based on the context or environment of the mobile device and/or may learn the user's habits or behaviors and switch between modes accordingly.

Figure 8A:
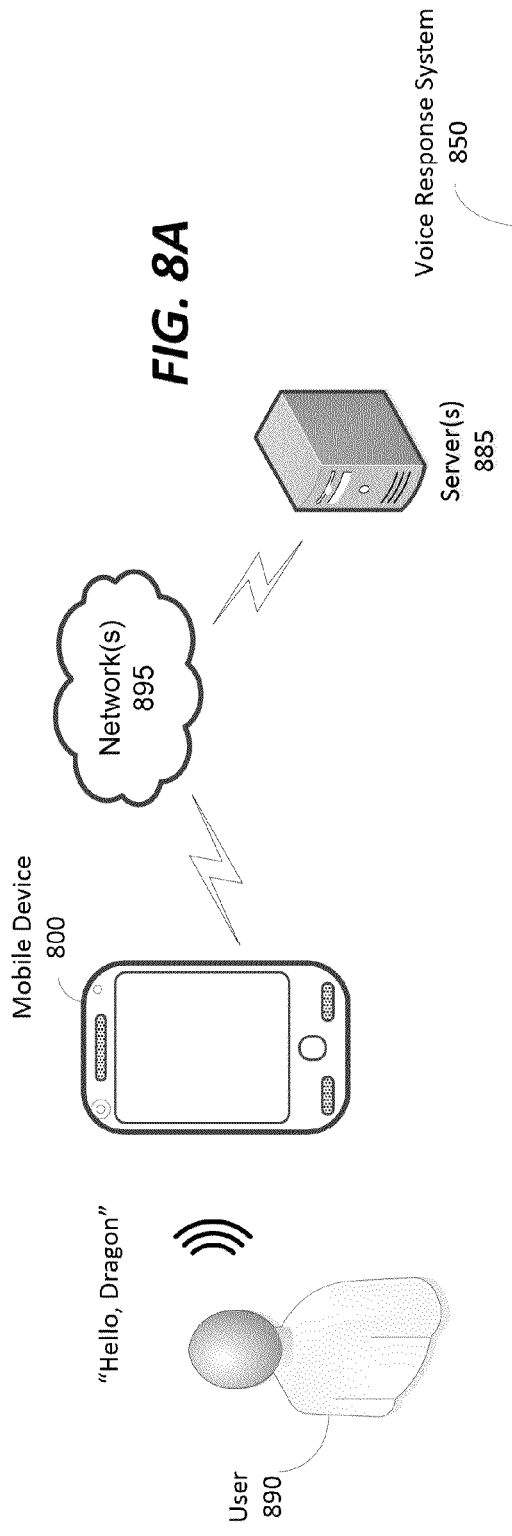
FIGS. 8A and 8B illustrate an example of a voice response system for determining whether acoustic input received from the environment of a mobile device includes a voice command when the mobile device is operating in a low power mode, in accordance with some embodiments.
Figure 8B:
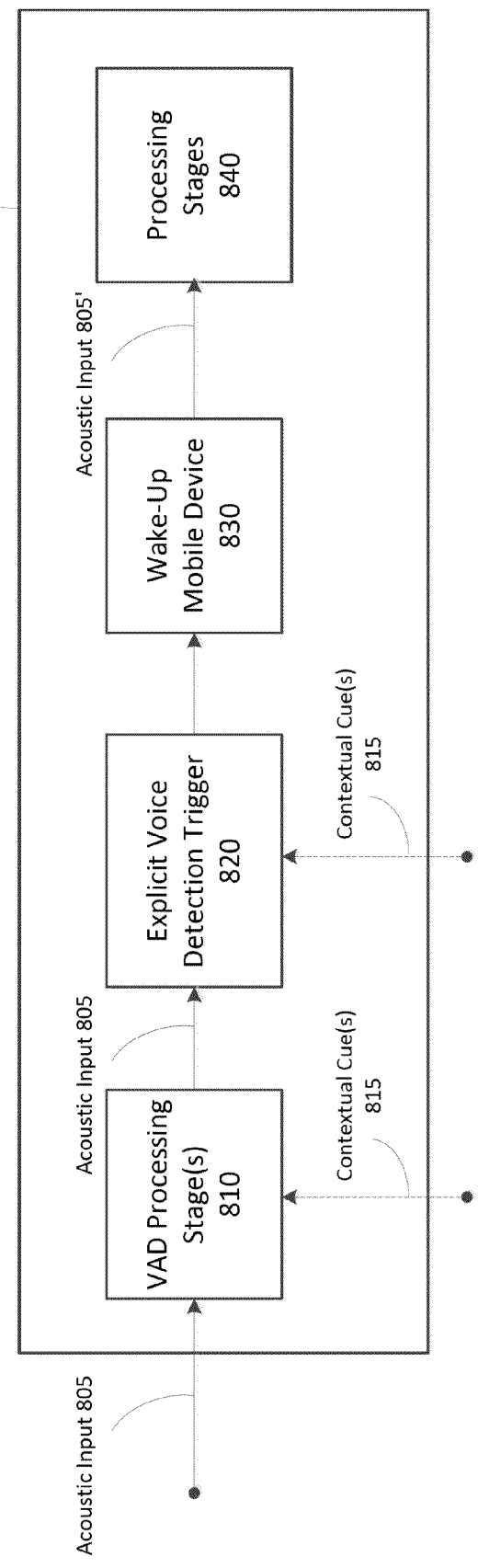

FIGS. 8A and 8B illustrate an example of a voice response system 850 configured to monitor the acoustic environment of a mobile device 800 to receive an acoustic input 805 and determine whether the acoustic input includes a voice command.

In this example, mobile device 800 is operating in a low power mode. For example, mobile device 800 may have been inactive for some period of time such that, to conserve battery power, the mobile device has turned off the display, powered down one or more processors and/or disabled certain system components. Conventionally, waking-up the mobile device so that its functionality is available requires one or more manual actions to re-engage the mobile device. Absent these manual actions, conventional mobile devices are rendered unresponsive to voice when operating in low power mode.

Voice response system 850 is configured to be responsive to voice even when the mobile device 800 is operating in a low power mode. In the example shown in FIGS. 8A and 8B, user 890 has spoken the words "Hello, Dragon" to wake-up the mobile device and engage the voice response system, or otherwise utilize functionality of the mobile device. "Hello, Dragon," in this example, represents an explicit voice trigger understood by voice response system 850. The user's speech may be detected by one or more microphones, located on mobile device, that has been kept at least partially on and enabled in order to monitor the acoustic environment of the mobile device. In this manner, acoustic input 805 may be received for processing even when the mobile device is operating in a low power mode.

As shown in FIG. 8B, one or more VAD processing stages 810 may be performed on acoustic input 805. As discussed above, any one or combination of VAD techniques may be applied and any desired order. In this respect, VAD processing stages 810 may be similar in some respects to VAD processing stages 710 in that both may attempt to generally minimize the power required to reach a conclusion as to whether the acoustic input includes voice content or not, and proceed accordingly based upon that evaluation.

In some embodiments, one or more generally low level acoustic input processing stages may be performed by the microphone (e.g., assessing amplitude levels, determining signal energy characteristics, etc.). In particular, some microphones (e.g., MEMS microphones) include an integrated circuit coupled to the transducer that performs some minimal level of processing of the electrical signals from the transducer. For example, the microphone IC may apply a gain or otherwise amplify the electrical signals as required and/or the microphone IC may perform some level of noise removal and/or filtering to enhance/suppress characteristics of the transducer signal.

The microphone IC may be configured to perform one or more VAD techniques that facilitate determining whether acoustic input sensed by the microphone includes a voice command or is merely unrelated acoustic activity. For example, the microphone IC may evaluate one or any combination of signal amplitude, signal energy, signal duration to assess whether the received signal merits passing on to further processing stages. In this manner, at least some acoustic activity may be disregarded by the microphone itself without consuming further processing power from the mobile device. Some mobile devices implement an audio codec to convert between analog and digital signals. One or more VAD processing stages may also be performed by the audio codec as well to provide some measure of VAD up front to potentially avoid further processing.

In the example in FIGS. 8A and 8B, VAD processing stage(s) 810 conclude that acoustic input 805 includes voice content, and the voice response system, based on the assessment that voice is present, decides to invoke explicit voice trigger detection 820 to determine whether the detected speech in acoustic input 805 corresponds to an explicit voice trigger. Generally speaking, detection of an explicit voice trigger involves determining whether the user spoke specific words in a specific order. An explicit voice trigger is often selected to consist of one or more words that are not expected to be used frequently during normal conversation and/or a word ordering having a relatively low expectancy of occurrence. For example, the explicit voice trigger "Hello Dragon" or "Wake-up Dragon" includes the word "Dragon," which alone may have a relatively low occurrence rate in normal speech and thus useable as a trigger phrase, preceded by the word "Hello" or "Wake-up" to provide an explicit voice trigger that is relatively unlikely to be spoken except by a user intending to engage the voice response system.

Explicit voice trigger detection may be performed using any number of techniques such as a rule-based approach, using a grammar, etc. In some embodiments, word and/or word order may be strictly enforced. That is, a user may be constrained to speak the correct words in the correct order for the system to determine that the user has spoken the explicit trigger phrase. According to some embodiments, some flexibility may be built into explicit voice trigger detection with respect to word choice and/or word order to provide the user with some leeway in this respect. For example, both "Hello Dragon" and "Wake-up Dragon" may be recognized as acceptable explicit voice triggers, providing some flexibility with respect to word choice. As another example, "Dragon Hello" and/or "Dragon Wake-up" may also be recognized as acceptable utterances, providing some flexibility with respect to word order. As a general matter, the more flexibility a user is given with respect to uttering an acceptable explicit voice trigger, the more processing will be required to detect an explicit voice trigger, resulting in increased power consumption. Thus, there may be a trade-of between providing flexibility and implementing the most efficient process in this respect.

Mobile device 800 may include a single processor, or may include multiple processors. When mobile device 800 includes a single processor (or includes multiple processors but only a single processor capable of performing one or more processing stages), voice response system 800 may activate the processor to the extent needed to perform the various processing stages in a given processing strategy. In a low power mode when multiple processors are available, a primary processor may be powered down into an idle or sleep state, and a secondary processor may be utilized to perform at least a portion of VAD processing stage(s) 810 and/or at least a portion of explicit voice detection 820. In this manner, at least some significant processing may be performed without having to wake-up or otherwise activate the primary processor (e.g., the clock system of the primary processor may remain substantially at the powered-down state of the low power mode the mobile device is operating in). According to some embodiments, VAD processing and explicit voice detection may be performed by the secondary processor without having to wake-up the primary processor to do so.

In the example in FIGS. 8A and 8B, explicit voice detection 820 determines that the user spoke a permissible explicit voice trigger. In response, voice response system 850 may transition the mobile device from the low power mode to an active mode (e.g. the voice response system may incrementally wake-up the mobile device as appropriate, or fully activate the mobile device). The extent to which the voice response system wakes-up the mobile device may depend upon the design of the voice response system. According to some embodiments, the voice response system may wake-up the mobile device to the same extent the mobile device is activated when a user performs the manual actions required to wake-up the device (e.g., the voice response system may turn on the display, activate the primary processor and/or otherwise ready the mobile device to perform any of its available functions). According to some embodiments, the voice response system maintains certain components in low power mode. For example, the voice response system may keep the display off but activate the primary processor to the extent that it wasn't already engaged after detecting the explicit voice trigger, or the voice response system may choose to keep the primary processor deactivated to the same extent it was after detecting the explicit voice trigger until it is needed to process further acoustic information (e.g., to process one or more actionable voice commands following the explicit voice trigger). This applies equally to circumstances in which only a single processor is utilized and when multiple processors are utilized.

According to some embodiments, voice response system 850 may provide an indication to the user that the explicit voice trigger was detected. For example, the voice response system may synthesize a voice acknowledgement to be rendered to the user via one or more speakers on the mobile device, and/or may turn-on, flash or otherwise utilize an LED on the mobile device to indicate that the explicit voice trigger was received and/or understood. Voice response system may indicate in other ways that the explicit voice trigger was detected and that the system is presently waiting for subsequent speech input to act upon or is presently processing any remainder of speech contained in acoustic input 805.

The voice response system may also generally provide feedback to the user that acoustic input has been received. For example, the mobile device may beep or provide some other audible indication that acoustic input has been received. The voice response system may wait to provide such an indication until some level of confidence has been reached that the acoustic input includes the user's speech. Receipt of acoustic input may also be performed using visual indicators such as using one or more LEDs, flashing the display, or via non-visual indicators such as vibration to let the user know that acoustic input was received. In some embodiments, one or more indicators may immediately provide feedback to the user based on any acoustic activity sensed by the mobile device. For example, one or more LEDs on the mobile device may be powered in correspondence to the amplitude of incoming acoustic information, thereby providing a meter of sorts to show the user the intensity of acoustic information being sensed by the mobile device.

Pursuant to the explicit voice trigger being detected, voice response system 850 may perform one or more processing stages 840 on subsequently received acoustic input 805' or any remainder of acoustic input 805 that may include actionable voice commands that the user expects the voice response system to respond to. Processing stages 840 may include any one or combination of processing stages described herein that are configured to understand the content of a user's voice command. For example, processing stages 840 may include one or more speech processing stages such as ASR or NLP to recognize and understand the voice command so as to take any actions needed to carry out the directives of the user's command.

It should be appreciated that any one or combination of processing stages 840 may be performed, and such processes may be performed locally or using network resources, as the aspect are not limited in this respect. As denoted by the dotted arrows in FIG. 8B, one or more contextual cues 815 may be evaluated at any of the stages of processing to assist in detecting a voice command by influencing the evaluation of one or more processing stages being performed on the acoustic input. However, the voice response system need not utilized contextual cues, as the aspects are not limited in this respect.

In some circumstances, a voice response system may detect that acoustic input includes a voice command, but may be unable to ascertain the intent of the user and/or the action that the user would like performed. For example, one or more ASR and/or one or more NLP stages may detect with a high degree of likelihood that acoustic input includes a voice command, but may be unable to map the voice command to one or more specific tasks or actions. According to some embodiments, a default action may be performed when a voice command is detected, but where there is sufficient uncertainty with respect to the intent of the voice command and/or the voice command cannot be suitably mapped to a specific task or set of tasks. The default action may be, for example, an internet search using one or more words recognized in the acoustic input. Alternatively, the default action may include formulating a question to be rendered to the user to obtain further information and/or clarification regarding the voice command. It should be appreciated that any default action may be assigned to voice commands that have been detected, but for which a specific task or set of tasks are not identified (e.g., with a sufficient level of certainty), as the aspects are not limited in this respect.

Such "catch-all" functionality allows a voice response system to be more responsive to a user even in the presence of uncertainty with respect to the user's intent, either by performing a generic action or by engaging in a dialog with the user to clarify the user's intent with respect to the voice command. According to some embodiments, such a "catch-all" functionality may be disabled when the mobile device is operating in a low power mode to avoid the mobile device taking action whenever a sequence of words is identified. In other embodiments, "catch-all" functionality may be enabled in low power mode, active mode or both, as the aspects are not limited in this respect.

Figure 9:
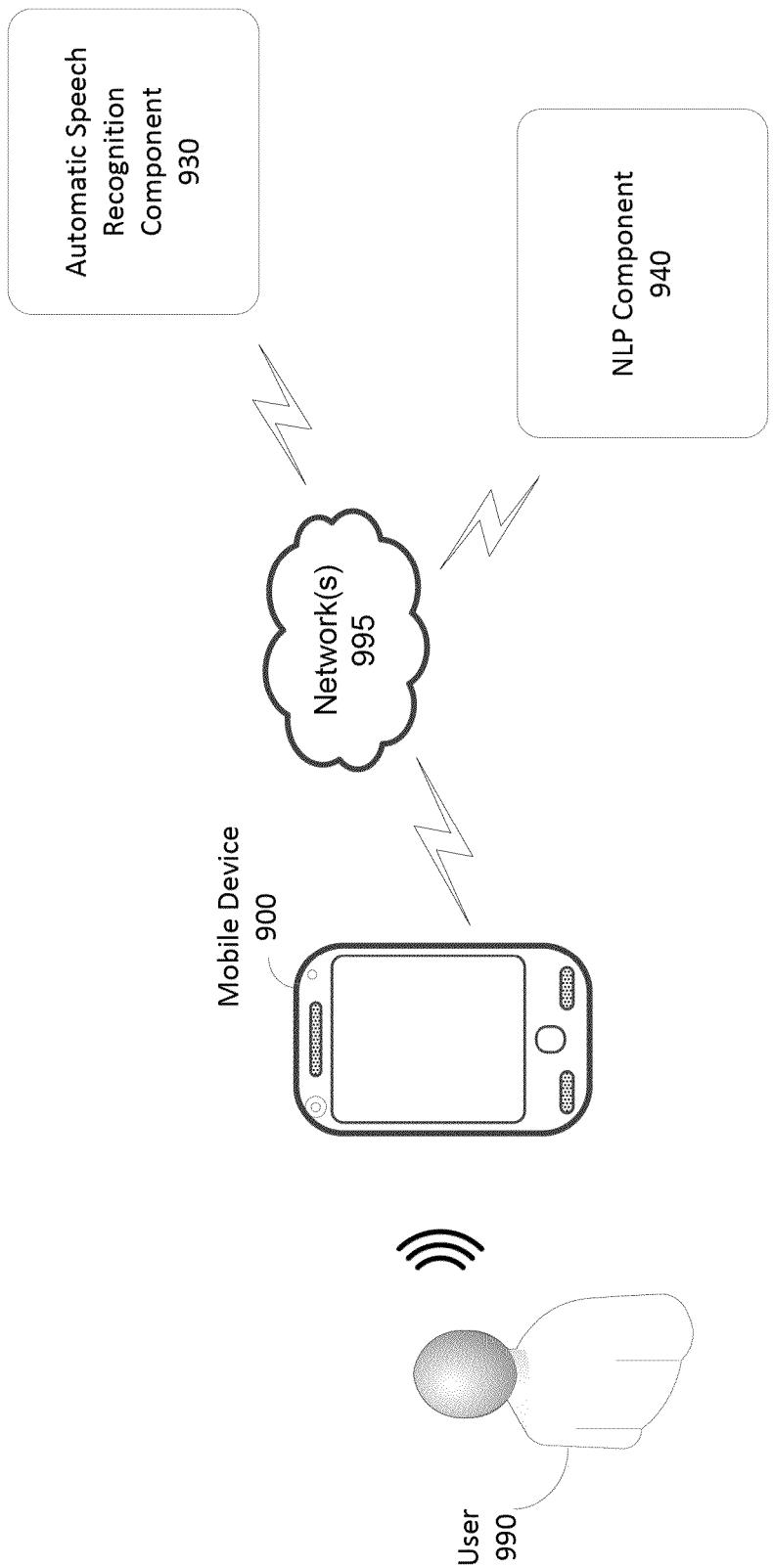
FIG. 9 illustrates a system including a mobile device capable of accessing one or more network resources to assist in assessing whether acoustic input includes a voice command, in accordance with some embodiments.

As discussed above, according to some embodiments, one or more processing stages may be performed by resource(s) available over a network. FIG. 9 illustrates exemplary network resources that may be utilized by a voice response system in assessing whether acoustic input includes a voice command. For example, mobile device 900 may communicate with automatic speech recognition (ASR) component 930 and/or natural language processing (NLP) component 940 via network(s) 995 to perform one or more processing stages. Each of these network resources may be implemented in software, hardware, or a combination of software and hardware. Components implemented in software may comprise sets of processor-executable instructions that may be executed by one or more processors of one or more network computers, such as a network server or multiple network servers. Each of ASR component 930 and NLP component 940 may be implemented as a separate component, or any combination of these components may be integrated into a single component or a set of distributed components implemented on one or multiple network computers (e.g., network servers). In addition, any one of ASR component 930 and NLP component 940 may be implemented as a set of multiple software and/or hardware components.

According to some embodiments, acoustic input may be transmitted to ASR component 930 to be recognized. The acoustic input may be processed in any suitable manner prior to providing the acoustic input to ASR component 930. For example, the acoustic input may be pre-processed to remove information, format the acoustic input or modify the acoustic input in preparation for ASR (e.g., the acoustic input may be formatted to conform with a desired audio format and/or prepared for streaming as an audio stream or prepared as an appropriate audio file) so that the acoustic input can be provided as an audio input to ASR component 930 (e.g., transmitted over a network).

ASR component 930 may be configured to process received audio input (e.g., audio input representing the acoustic input) to form a textual representation of the audio input (e.g., a textual representation of the constituent words in the acoustic input that can be further processed to understand the meaning of the constituent words). Such processing to produce a textual representation may be performed in any suitable way. In some embodiments, ASR component 930 may convert speech to a representation other than a textual representation, or the speech may not be recognized as words, but instead a sequence or collection of abstract concepts. It should be appreciated that the words and/or concepts represented in the acoustic input may be represented and/or stored as data in any suitable form, as aspects are not limited in this respect. ASR component 930 may transmit the recognized acoustic input over the network to be received by the mobile device and/or ASR component 930 may provide the recognized acoustic input to NLP component 940 to assist in understanding the semantic content of the acoustic input to evaluate whether the acoustic input includes a voice command. According to some embodiments, ASR component 930 may be configured to perform limited vocabulary recognition and/or generally unrestricted recognition using one or any combination of suitable acoustic models, vocabularies/lexicons, grammars, language models, etc. to perform recognition, as aspects are not limited for use with any particular ASR implementation. Any of the ASR processing stages described herein may be performed by ASR component 930.

As discussed above, one or more processing stages may be performed by NLP component 940 configured to process acoustic input (e.g., a textual representation of the acoustic input or a portion of the acoustic input) to ascertain the semantic content of the acoustic input. NLP component 940 may use any suitable language understanding techniques to ascertain the meaning of the acoustic input so as to assist in assessing whether the acoustic input includes a voice command and/or what tasks or actions are specified therein. For example, NLP component may be configured to identify and extract grammatical and/or syntactical components of the acoustic input, such as parts of speech, or words or phrases belonging to known semantic categories, to facilitate an understanding of the acoustic input. For example, NLP component 940 may identify action words (e.g., action words suggestive of specific tasks or actions), subject words, topic words, and/or any other type or category of words the NLP component 940 may deem relevant to ascertaining the semantic form or content of the acoustic input to facilitate determining whether the acoustic input includes a voice command and/or what tasks or actions are specified therein (e.g., understand the intent of the user).

NLP component 140 may use, employ or implement one or more statistical models to extract semantic entities from natural language input. In general, some statistical models can be described as a functional component designed and/or trained to analyze new inputs based on probabilistic patterns observed in prior training inputs. In this sense, statistical models differ from "rule-based" models, which typically apply hard-coded deterministic rules to map from inputs having particular characteristics to particular outputs. By contrast, a statistical model may operate to determine a particular output for an input with particular characteristics by considering how often (e.g., with what probability) training inputs with those same characteristics (or similar characteristics) were associated with that particular output in the statistical model's training data. For example, in the context of a voice response system, the input on which the model operates may correspond to acoustic input (or a representation derived therefrom) and the output may include an identification that a voice command is present and/or identification of one or more tasks or actions specified by the voice command and/or one or more associated parameters.

To supply the probabilistic data that allows a statistical model to extrapolate from the tendency of particular input characteristics to be associated with particular outputs in past examples, statistical models are typically trained (or "built") on training corpuses with a sufficiently large numbers of example inputs. Typically, the example inputs are labeled with the known outputs with which they should be associated (e.g., a corpus of acoustic input may be labeled with the correct task the instruction specifies), often by a human labeler (e.g., with expert knowledge of the domain), or sometimes automatically. Characteristics of interest (known as "features") are identified ("extracted") from the inputs, and the statistical model learns the probabilities with which different features are associated with different outputs, based on how often training inputs with those features are associated with those outputs. When the same features are extracted from a new input (e.g., an input that has not been labeled with a known output, for example, by a human), the statistical model can then use the learned probabilities for the extracted features (as learned from the training data) to determine which output is most likely correct for the new input. In the context of evaluating recognized acoustic input, the features may correspond to the words, concepts, associations, relationships, etc. identified in the acoustic input, and the statistical model may determine whether such features are suggestive of a voice command and/or which one or more tasks or actions are most likely specified based on these features and their relationships.

NLP component 940 may also include (or alternatively include) one or more rule-based models that provide a set of rules as to how to map words or phrases in acoustic input to voice commands and/or corresponding task(s) and/or that map words or phrases in acoustic input to parameters of an identified task. For example, NLP component 940 may include a rule-based natural language processing component to extract relevant facts about the constituent words recognized in the acoustic input, link facts to concepts or otherwise assist in assessing whether a voice command is present and/or identifying one or more tasks specified in acoustic input. In a rule-based system, a linguist and/or other individual may create a plurality of rules that can specify what words or combinations or words evidence that recognized acoustic input includes a voice command and/or specifies a particular task. Rule-based techniques can be employed by NLP component 940 to determine whether acoustic input includes a voice command and/or identify one or more tasks or actions specified in the acoustic input and/or any parameters associated with identified tasks.

It should be appreciated that an NLP component may utilize one or any combination of techniques described above to ascertain whether a voice command is present and/or identify task(s) in acoustic input and/or identify any parameters associated with identified task(s), as aspects are not limited for use with any particular technique or combination of techniques. In accordance with one embodiment described herein, a hybrid approach is used in which NLP component 940 employs both a statistical model and a rules-based component to evaluate whether acoustic input includes a voice command and/or to identify one or more tasks specified in the acoustic input. Such a hybrid approach can be implemented in any of numerous ways, as aspects that employ a hybrid approach are not limited to any particular implementation technique. In accordance with some embodiments, the statistic model and rules-based component of the NLP component 940 may operate in parallel on the same acoustic input, and in some embodiments they may operate serially. In either parallel or serial operation, the statistic model and the rules-based component may operate independently or may exchange information to facilitate evaluating the semantic content of the acoustic input (e.g., to assess whether a voice command is present and/or to identify task(s) specified in the acoustic input, and/or parameters associated with an identified task).

According to some embodiments, a rules-based component may perform a first pass on acoustic input to identify semantic entities by, for example, extracting relevant facts regarding the language used, linking words or phrases into concepts, and/or identifying other characteristics of known tasks. Thereafter, the statistical model may be used to process the semantic entities to determine what one or more tasks the acoustic input most likely relates to. That is, the outputs of the rules-based component can be used as features for the statistical model. For example, when a rule fires or otherwise indicates that the rule has been met, this may be a feature evaluated by the statistical model. Some rules may be quite specific, so that a firing of the rule indicates with high probability that the determination expressed thereby is accurate (e.g., detection of the word "call" in combination with identifying a proper name may indicate with high probability that the acoustic input includes a voice command to make a telephone call).

According to some embodiments, a statistical model may operate to identify the one or more tasks most likely specified by the acoustic input and the rule-based component may be used to identify one or more parameters from the acoustic input associated with the identified task. A statistical model and a rule-based component may be used in other suitable ways, as the aspects are not limited in this respect. In accordance with some embodiments, a determination can be made about whether to use a statistical model or a rule-based component depending upon the content of the acoustic input. For example, some voice commands that are very structured may lend themselves to rules, whereas types of voice commands with significant variability in how they are expressed in natural language may be better suited to the use of a statistical model.

Again, the descriptions provided above for combining the use of a rule-based component with a statistical model are merely illustrative, as the techniques described herein are not limited to any particular implementation or choice of techniques. The techniques described herein can be implemented using solely a statistical model, solely a rule-based component, or any combination, as they are not limited to any particular implementation technique. That is, processing by NLP component 940 may be as simplistic or as sophisticated as desired to suitably evaluate whether acoustic input includes a voice command and/or to identify one or more tasks when they are present in acoustic input.

As discussed above, when a mobile device is operating in a low power mode, in some circumstances it may make sense from a power consumption perspective to transmit the acoustic input over the network and allow available network resources (e.g., ASR component 930 and/or NLP component 940) to evaluate whether the acoustic input includes a voice command. In some embodiments, only the components needed to conduct such a network transaction need be activated to access and utilize the network resources, while other components may remain in a low power state. It should be appreciated that any of the above techniques described in connection with ASR component 930 and/or NLP component 940 may alternatively be (or in addition to) implemented on the mobile device.

Figure 10:
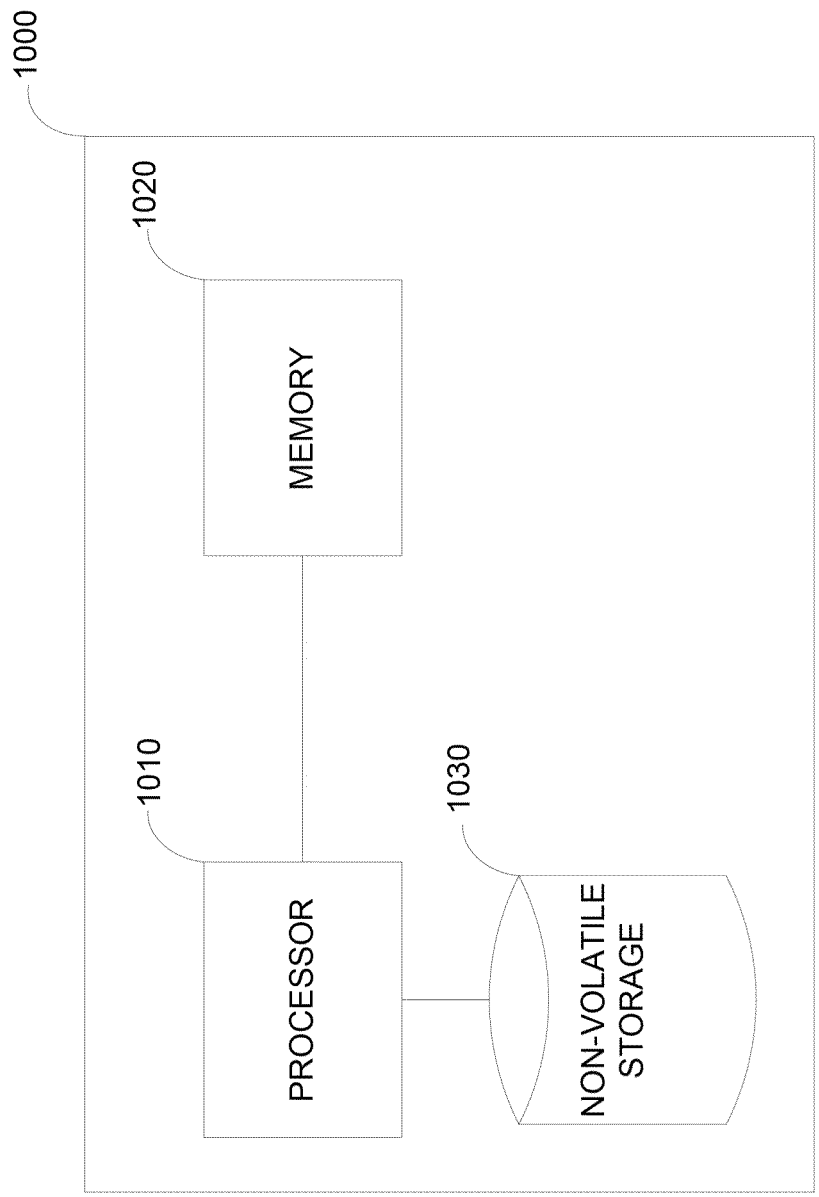
FIG. 10 illustrates an exemplary computer system on which techniques described herein may be implemented.

An illustrative implementation of a computer system 1000 that may be used to implement one or more of the voice response techniques described herein is shown in FIG. 10. Computer system 1000 may include one or more processors 1010 and one or more non-transitory computer-readable storage media (e.g., memory 1020 and one or more non-volatile storage media 1030). The processor 1010 may control writing data to and reading data from the memory 1020 and the non-volatile storage device 1030 in any suitable manner, as the aspects of the invention described herein are not limited in this respect. Processor 1010, for example, may be a processor on a mobile device.

To perform functionality and/or techniques described herein, the processor 1010 may execute one or more instructions stored in one or more computer-readable storage media (e.g., the memory 1020, storage media, etc.), which may serve as non-transitory computer-readable storage media storing instructions for execution by processor 1010. Computer system 1000 may also include any other processor, controller or control unit needed to route data, perform computations, perform I/O functionality, etc. For example, computer system 1000 may include any number and type of input functionality to receive data and/or may include any number and type of output functionality to provide data, and may include control apparatus to perform I/O functionality.

In connection with determining whether acoustic input includes a voice command, one or more programs configured to receive acoustic input, perform one or more processing stages on acoustic input or otherwise execute functionality described herein may be stored on one or more computer-readable storage media of computer system 1000. In particular, some portions or all of a voice response system may be implemented as instructions stored on one or more computer-readable storage media. Processor 1010 may execute any one or combination of such programs that are available to the processor by being stored locally on computer system 1000 or accessible over a network. Any other software, programs or instructions described herein may also be stored and executed by computer system 1000. Computer system 1000 may be the computer system on a mobile device. Computer system 1000 may also be implemented as a standalone computer, server, part of a distributed computing system, and may be connected to a network and capable of accessing resources over the network and/or communicate with one or more other computers connected to the network (e.g., computer system 1000 may be part of the network resources available to a voice response system implemented on a mobile device).

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which multiple examples have been provided. The acts performed as part of each process may be ordered in any suitable way. Accordingly, embodiments may be constructed in which acts are performed in an order different than illustrated, which may include performing some acts concurrently, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of monitoring an acoustic environment of a mobile device for voice commands when the mobile device is operating in an idle mode, the mobile device having a first processor and a second processor, the method comprising:
   receiving acoustic input while the mobile device is operating in the idle mode;
   performing at least one first processing stage on the acoustic input using the first processor, prior to engaging the second processor to process the acoustic input, to evaluate whether the acoustic input includes a voice command;
   performing at least one second processing stage on the acoustic input using the second processor to evaluate whether the acoustic input includes a voice command if further processing is needed to determine whether the acoustic input includes a voice command;

wherein performing the at least one first processing stage or the at least one second processing stage includes, while the mobile device is operating in the idle mode, transmitting at least a portion of the acoustic input to at least one server via a network for processing by the at least one server at least to evaluate whether the acoustic input includes a voice command; and initiating responding to the voice command when either the at least one first processing stage or the at least one second processing stage determines that the acoustic input includes a voice command.

2. The method of claim 1, wherein the first processor or the second processor is located at the at least one server.

3. The method of claim 1, wherein the first processor is a digital signal processor configured to operate at a lower power than the second processor.

4. The method of claim 1, wherein performing the at least one first processing stage includes performing at least one voice activity detection processing stage including performing at least one of spectral analysis on the acoustic input to evaluate whether the spectrum of the acoustic input is indicative of voice activity, periodicity analysis to evaluate whether the signal periodicity is indicative of voice activity, and phone loop analysis to evaluate whether the acoustic input includes speech.

5. The method of claim 1, wherein performing the at least one first processing stage comprises performing limited vocabulary automatic speech recognition on the acoustic input to detect whether the acoustic input includes an explicit voice trigger.

6. The method of claim 1, wherein performing the at least one second processing stage comprises performing at least one speech processing stage including at least one of automatic speech recognition on the acoustic input, at least one classification processing stage, and at least one natural language processing stage to understand the meaning of the voice command.

7. The method of claim 6, wherein performing the at least one second processing stage comprises performing limited vocabulary automatic speech recognition on the acoustic input to detect whether the acoustic input includes an explicit voice trigger.

8. The method of claim 1, further comprising providing, prior to activating the second processor or turning on a display of the mobile device, at least one indication to the user to confirm that the acoustic input was received and is being processed.

9. The method of claim 1, further comprising transitioning the mobile device to an active mode to respond to the voice command when either the at least one first processing stage or the at least one second processing stage determines that the acoustic input includes a voice command.

10. The method of claim 1, wherein at least one task specified by the voice command is performed with the mobile device remaining in the idle mode.

11. The method of claim 1, further comprising performing one or more default actions when a specific task could not be ascertained from the acoustic input.

12. The method of claim 1, wherein performing the at least one first processing stage comprises evaluating at least one contextual cue selected from a group consisting of: time of day, motion of the mobile device, location of the mobile device, an occurrence of an event on the mobile device, recent activity on the mobile device and state of a battery powering the mobile device.

13. The method of claim 1, wherein performing the at least one second processing stage comprises evaluating at least one contextual cue selected from a group consisting of: time of day, motion of the mobile device, location of the mobile device, an occurrence of an event on the mobile device, recent activity on the mobile device and state of a battery powering the mobile device.

14. A mobile device comprising:
at least one input to receive acoustic input from an environment of the mobile device while the mobile device is operating in an idle mode;
a first processor to perform at least one first processing stage on the acoustic input to evaluate whether the acoustic input includes a voice command;
a second processor to perform at least one second processing stage on the acoustic input to evaluate whether the acoustic input includes a voice command, and
wherein the mobile device is configured to provide, prior to waking up the mobile device, at least one indication to the user to confirm that the acoustic input was received and is being processed, wherein the at least one first processing stage is performed prior to engaging the second processor, wherein the at least one second processing stage is performed if further processing is needed to determine whether the acoustic input includes a voice command, and wherein response to the voice command is initiated when either the at least one first processing stage or the at least one second processing stage determines that the acoustic input includes a voice command.

15. The mobile device of claim 14, wherein the at least one indication to the user includes illuminating one or more light emitting diodes of the mobile device.

16. The mobile device of claim 14, wherein the at least one low power indication includes at least one audio signal indicating that the acoustic input was received and is being processed.

17. The mobile device of claim 14, wherein performing the at least one first processing stage or the at least one second processing stage includes, while the mobile device is operating in the idle mode, transmitting at least a portion of the acoustic input to at least one server via a network for processing by the at least one server at least to evaluate whether the acoustic input includes a voice command.

* * * * *